US009629174B2

(12) United States Patent
Agiwal et al.

(10) Patent No.: US 9,629,174 B2
(45) Date of Patent: Apr. 18, 2017

(54) APPARATUS AND METHOD FOR COLLISION AVOIDANCE BETWEEN HYBRID AUTOMATIC REPEAT REQUEST TRANSMISSION AND DEVICE TO DEVICE TRANSMISSION IN COMMUNICATION SYSTEM SUPPORTING DEVICE TO DEVICE SCHEME

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 14/569,973

(22) Filed: Dec. 15, 2014

(65) Prior Publication Data
US 2015/0173098 A1 Jun. 18, 2015

(30) Foreign Application Priority Data
Dec. 13, 2013 (IN) .............................. 1410/KOL/2013
May 19, 2014 (IN) .............................. 557/KOL/2014

(51) Int. Cl.
*H04W 72/12* (2009.01)
*H04L 1/18* (2006.01)
*H04W 74/08* (2009.01)

(52) U.S. Cl.
CPC ............... *H04W 72/12* (2013.01); *H04L 1/18* (2013.01); *H04L 1/1887* (2013.01); *H04W 74/0816* (2013.01); *H04W 74/0825* (2013.01)

(58) Field of Classification Search
None
See application file for complete search history.

(56) References Cited

U.S. PATENT DOCUMENTS

| 8,296,616 B2* | 10/2012 | Wu | H04L 1/189 |
| | | | 714/748 |
| 2009/0103440 A1* | 4/2009 | Wang | H04L 1/1812 |
| | | | 370/237 |
| 2009/0265599 A1* | 10/2009 | Chae | H04L 1/1812 |
| | | | 714/749 |
| 2010/0208677 A1* | 8/2010 | Ahn | H04W 72/1257 |
| | | | 370/329 |

(Continued)

OTHER PUBLICATIONS

Interdigital, "D2D Communications", R1-133178, 3GPP TSG RAN WG1 Meeting #74, Aug. 10, 2013, pp. 1-7, Barcelona, Spain.
(Continued)

*Primary Examiner* — Candal Elpenord
(74) *Attorney, Agent, or Firm* — Jefferson IP Law, LLP

(57) ABSTRACT

A method for avoiding a collision between a hybrid automatic repeat request (HARQ) transmission and a device to device (D2D) transmission by a base station (BS) in a communication system supporting a D2D scheme is provided. The method includes determining whether a user equipment (UE) is a legacy UE or a non-legacy UE, determining non-D2D sub-frames which will collide with D2D sub-frames if the UE is the non-legacy UE, determining whether the non-D2D sub-frames are available, and scheduling a new HARQ packet for the UE in the determined non-D2D sub-frames if the determined non-D2D sub-frames are available.

28 Claims, 25 Drawing Sheets

(56) References Cited

U.S. PATENT DOCUMENTS

| | | | |
|---|---|---|---|
| 2011/0216676 A1* | 9/2011 | Li | H04W 74/002 370/281 |
| 2013/0184024 A1 | 7/2013 | Chen et al. | |
| 2013/0188546 A1* | 7/2013 | Turtinen | H04W 8/005 370/312 |
| 2013/0223353 A1* | 8/2013 | Liu | H04W 76/023 370/329 |
| 2015/0049740 A1* | 2/2015 | Lee | H04W 72/1268 370/336 |

OTHER PUBLICATIONS

ZTE, "Study on D2D Communication", R1-133148, 3GPP TSG RAN WG1 Meeting #74, Aug. 10, 2013, pp. 1-9, Barcelona, Spain.
CATT, "Multiplexing between cellular link and D2D link", R1-135093, 3GPP TSG RAN WG1 Meeting #75, Nov. 1, 2013, pp. 1-3, San Francisco, USA.
LG Electronics, "Discussion on multiplexing of Uu and D2D discovery", R1-135486, 3GPP TSG RAN WG1 Meeting #75, Nov. 1, 2013 pp. 1-3, San Francisco, USA.

* cited by examiner

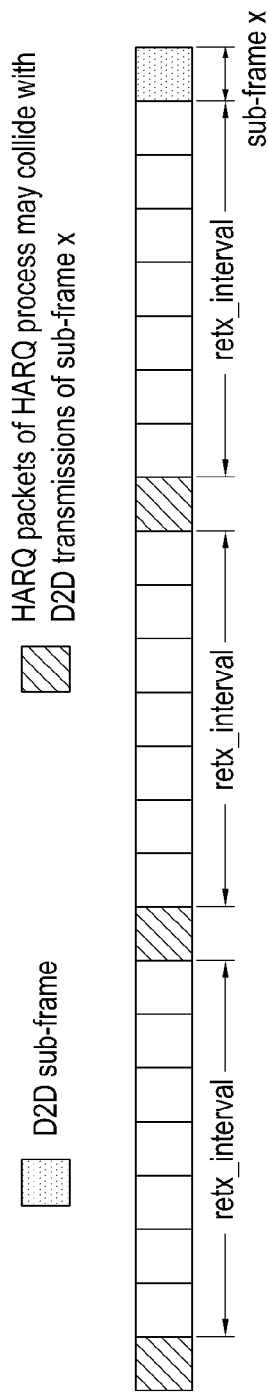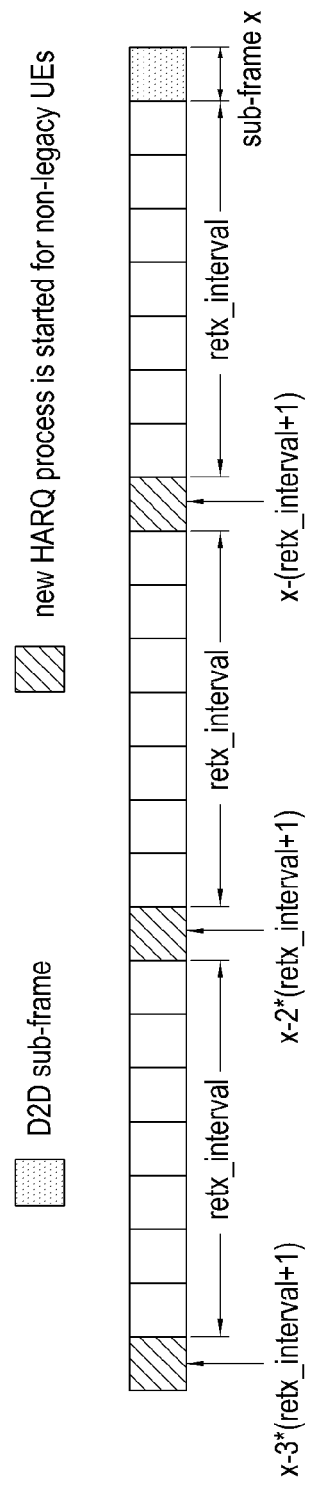
FIG.1 (RELATED ART)
FIG.2

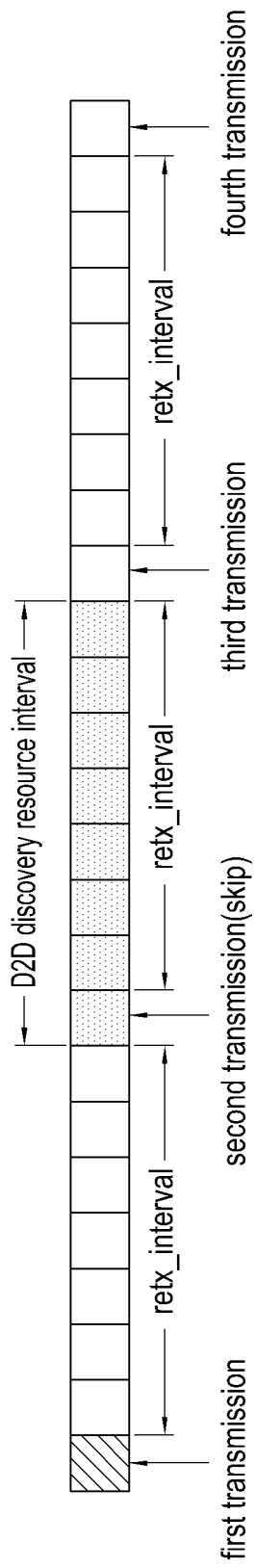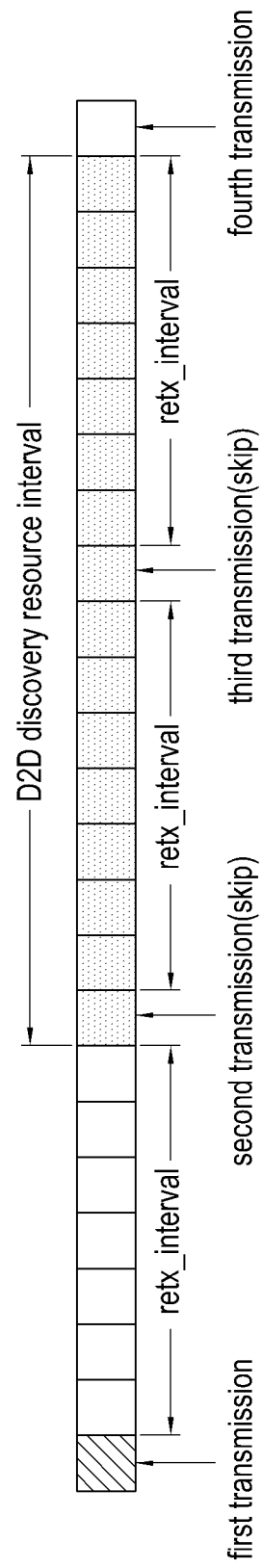
FIG.12A
FIG.12B

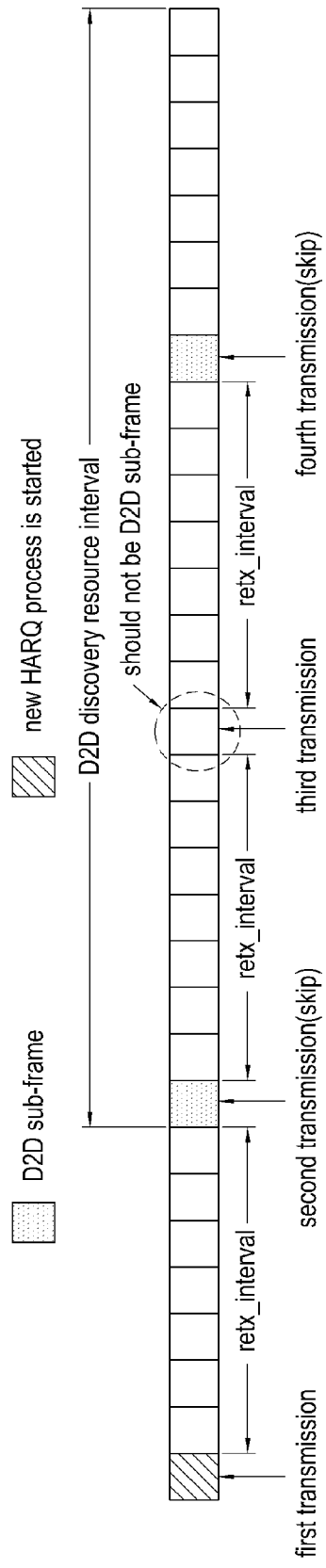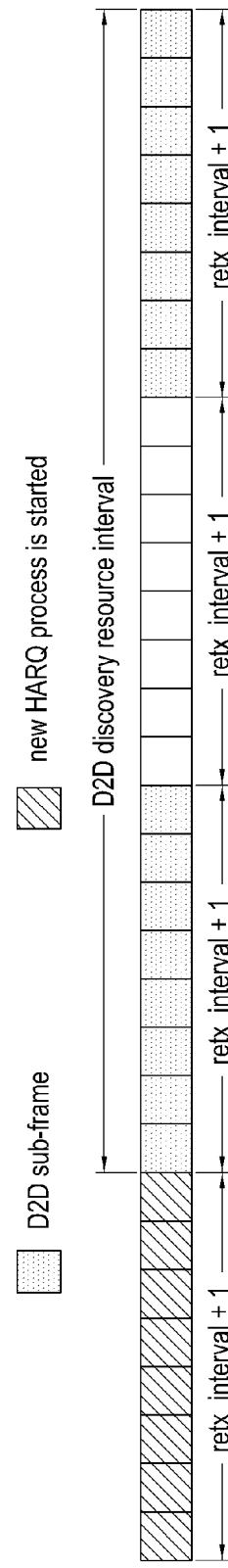
FIG.13A
FIG.13B

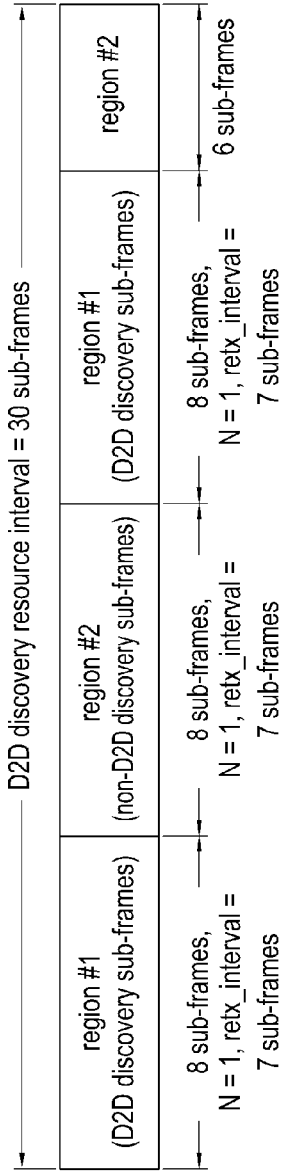
FIG.15C
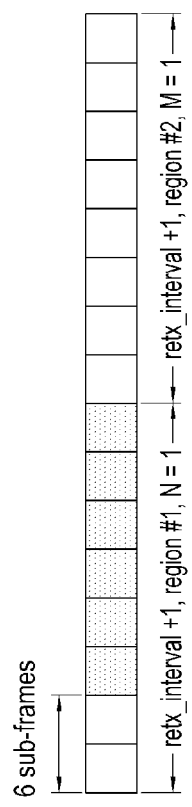
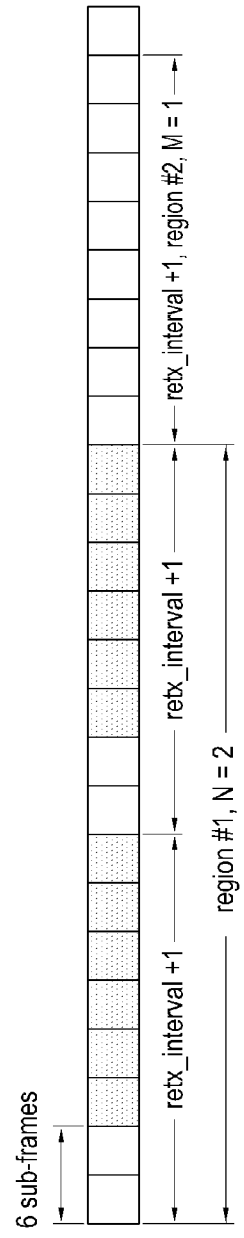
FIG.16

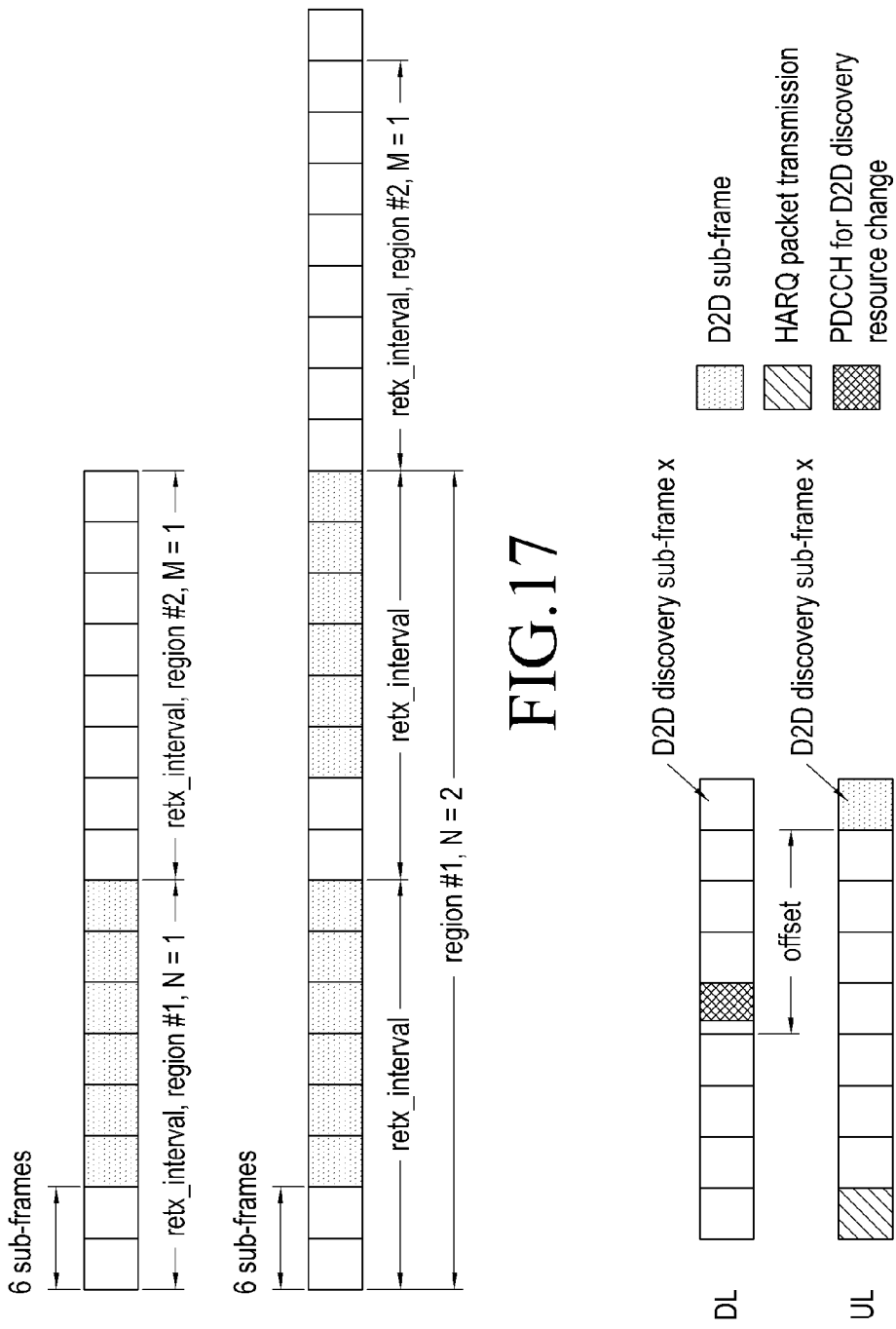

APPARATUS AND METHOD FOR COLLISION AVOIDANCE BETWEEN HYBRID AUTOMATIC REPEAT REQUEST TRANSMISSION AND DEVICE TO DEVICE TRANSMISSION IN COMMUNICATION SYSTEM SUPPORTING DEVICE TO DEVICE SCHEME

CROSS-REFERENCE TO RELATED APPLICATION(S)

This application claims the benefit under 35 U.S.C. §119 (a) of an Indian patent application filed on Dec. 13, 2013 in the Indian Intellectual Property Office and assigned Serial number 1410/KOL/2013, and an Indian patent application filed on May 19, 2014 in the Indian Intellectual Property Office and assigned Serial number 557/KOL/2014, the entire disclosure of each of which is hereby incorporated by reference.

TECHNICAL FIELD

The present disclosure relates to an apparatus and a method for collision avoidance between a hybrid automatic repeat request (HARD) transmission by a user equipment (UE) and a device to device (D2D) transmission by another UE in a communication system supporting a D2D scheme.

BACKGROUND

A device to device (D2D) discovery process is a process of determining whether a D2D-enabled user equipment (UE) is in proximity of other D2D-enabled UE. A discovering D2D-enabled UE determines whether other D2D-enabled UE is of interest to the discovering D2D-enabled UE based on the D2D discovery process. The other D2D-enabled UE is of interest to the discovering D2D-enabled UE if proximity of the other D2D-enabled UE needs to be known by one or more authorized applications on the discovering D2D-enabled UE. For example, a social networking application may be enabled to use a D2D discovery feature. The D2D discovery process enables a D2D-enabled UE of a given user of a social networking application to discover D2D-enabled UEs of friends of the given user of the social networking application, or to be discoverable by the D2D-enabled UEs of the friends of the given user of the social networking application. In another example, the D2D discovery process may enable the D2D-enabled UE of a given user of a search application to discover stores/restaurants, and the like of interest of the D2D-enabled UE of the given user of the search application in proximity of the D2D-enabled UE of the given user of the search application.

A radio spectrum or radio frequency used for D2D communication is identical to a radio spectrum or radio frequency used for general communication between a UE and base station (BS). For example, in a frequency division duplex (FDD) system, a D2D transmission and a transmission from a UE to a BS may be configured on an uplink (UL) frequency. Radio resources for a D2D transmission are allocated or reserved on the UL frequency. In a time division duplex (TDD) system, radio resources, i.e., UL radio frames/sub-frames or specific frequency resources in radio frame/sub-frames are reserved for a D2D transmission.

One of issues according to coexistence of a D2D transmission and a transmission from a UE to a BS in UL resources is collision between a hybrid automatic repeat request (HARQ) transmission by a UE and a D2D transmission by another UE.

For communication, a wireless link is divided into time slots, i.e., radio frames. Length of each radio frame is 10 ms. Each radio frame is further divided into 10 sub-frames, and length of each sub-frame is lms. A sub-frame is a minimum unit for transmitting a data packet, and is called a transmit time interval (TTI).

Meanwhile, a HARQ scheme is used for transmitting data packets from a UE to a BS. A HARQ packet carrying a data packet is transmitted in a TTI by a UE to a BS in UL, and the UE waits for feedback information from the BS. If the feedback information indicates that the HARQ packet is not successfully received, the UE retransmits the HARQ packet to the BS. If the feedback information indicates that the HARQ packet is successfully received, the UE does not retransmit the HARQ packet.

Meanwhile, a maximum retransmission number for an arbitrary HARQ packet is predetermined. In a UL, a synchronous HARQ scheme is used, and the synchronous HARQ scheme indicates that a TTI for retransmissions is fixed with respect to initial transmission (i.e., a TTI for a retransmission is at fixed timer interval from the first transmission). One HARQ process constitutes one HARQ packet transmission (including retransmissions and feedback thereof). There is a fixed time interval between two HARQ transmissions of an HARQ process. A UL HARQ scheme may be adaptive or non-adaptive. Here, an adaptive HARQ scheme indicates that resources and a modulation and coding scheme (MCS) level for HARQ retransmissions may be changed in a TTI based on signaling by a BS. The TTI in the adaptive HARQ scheme is not changed. A non-adaptive HARQ scheme indicates that all HARQ retransmissions are performed using a resource and an MCS level which are identical to a resource and an MCS level used in initial (first) HARQ transmission.

For supporting a D2D scheme in a UL frequency, certain radio sub-frames are allocated for the D2D scheme in a periodic basis. A UL HARQ packet of a HARQ process which is started in a non-D2D sub-frame for UE-BS communication by a UE may collide with D2D transmissions by another UE in a D2D sub-frame, and this will be described with reference to FIG. 1. Here, the UE-BS communication denotes communication between a UE and a BS, and the non-D2D sub-frame denotes a sub-frame which is not a D2D sub-frame. For example, the D2D sub-frame is a D2D discovery sub-frame.

FIG. 1 schematically illustrates a collision between a HARQ transmission by a UE and a D2D transmission by another UE in a communication system supporting a D2D scheme according to the related art.

Referring to FIG. 1, a radio sub-frame x is allocated/reserved for a D2D scheme. HARQ packets of a HARQ process which is started in radio sub-frames x−n*(retx_interval+1) will collide with D2D transmissions in a D2D sub-frame x. Here, n denotes an integer which is from 1 to N, and N denotes a maximum retransmission number for a HARQ packet. Referring to FIG. 1, a maximum transmission number for a specific packet is 4, and a maximum retransmission number is 3. Referring to FIG. 1, a retx_interval denotes a time interval between two HARQ packets of a HARQ process, i.e., a retransmission interval. The collision between a D2D transmission by a UE and HARQ packet transmissions by another UE affects performance of both D2D communication and UE-BS communication.

In some prior arts, all sub-frames at an interval equal to a retx_interval which is started from a predetermined sub-frame are reserved for D2D communication. The D2D communication is performed in sub-frames reserved for the D2D communication, this is very inefficient from the perspective of the D2D communication, because this will lead to large amount of resource reservation for the D2D communication. For example, for a retx_interval equal to 8 sub-frames, up to 15% of radio resources are reserved for D2D communication, and this percentage is very high. High percentage of resources which are reserved for D2D communication will lead to frequent UE wake up. Generally, in D2D communication, a plurality of sub-frames (for example, 32 sub-frames or 64 sub-frames) will be reserved at a regular interval in order of seconds to minimize a wake up number for UEs and resources for the D2D communication. Like this, resource minimization may be very important factor for enhancing performance of a communication system since a D2D communication coexists with UE-BS communication.

Therefore, there is a need for an apparatus and a method for collision avoidance between a HARQ transmission of a HARQ process by a UE and a D2D transmission by another UE in a communication system supporting a D2D scheme.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for avoiding a collision between a hybrid automatic repeat request (HARQ) transmission by a user equipment (UE) and a device to device (D2D) transmission by another UE in a communication system supporting a D2D scheme.

Another aspect of the present disclosure is to provide an apparatus and a method for avoiding a collision between a HARQ transmission by a UE and a D2D transmission by another UE based on a UE type in a communication system supporting a D2D scheme.

Another aspect of the present disclosure is to provide an apparatus and a method for avoiding a collision between a HARQ transmission by a UE and a D2D transmission by another UE based on a resource type in a communication system supporting a D2D scheme.

Another aspect of the present disclosure is to provide an apparatus and a method for skipping a HARQ transmission and a HARQ retransmission based on a UE type in a communication system supporting a D2D scheme.

Another aspect of the present disclosure is to provide an apparatus and a method for skipping HARQ transmission and HARQ re-transmission based on a resource type in a communication system supporting a D2D scheme.

Another aspect of the present disclosure is to provide an apparatus and a method for scheduling a HARQ transmission and a HARQ retransmission based on whether there is a collision between a D2D discovery resource and a non-D2D discovery resource in a communication system supporting a D2D scheme.

Another aspect of the present disclosure is to provide an apparatus and a method for scheduling a new HARQ transmission based on a UE type in a communication system supporting a D2D scheme.

Another aspect of the present disclosure is to provide an apparatus and a method for scheduling a new HARQ transmission based on a resource type in a communication system supporting a D2D scheme.

Another aspect of the present disclosure is to provide an apparatus and a method for scheduling a new HARQ transmission based on whether there is a collision between a D2D discovery resource and a non-D2D discovery resource in a communication system supporting a D2D scheme.

In accordance with an aspect of the present disclosure, a method for avoiding a collision between a HARQ transmission and a D2D transmission by a base station (BS) in a communication system supporting a D2D scheme is provided. The method includes determining whether a UE is a legacy UE or a non-legacy UE, determining non-D2D sub-frames which will collide with D2D sub-frames if the UE is the non-legacy UE, determining whether the non-D2D sub-frames are available, and scheduling a new HARQ packet for the UE in the determined non-D2D sub-frames if the determined non-D2D sub-frames are available.

In accordance with another aspect of the present disclosure, a method for avoiding a collision between a HARQ transmission and a D2D transmission by UE in a communication system supporting a D2D scheme is provided. The method includes determining whether the UE is a legacy UE or a non-legacy UE, detecting D2D resource information if the UE is the non-legacy UE, determining D2D sub-frames based on the D2D resource information, detecting that a sub-frame for transmission/retransmission of a HARQ packet will collide with the D2D sub-frames while transmitting/retransmitting the HARQ packet, and skipping the transmission/retransmission of the HARQ packet after detecting that the sub-frame for the transmission/retransmission of the HARQ packet will collide with the D2D sub-frames.

In accordance with still another aspect of the present disclosure, a BS in a communication system supporting a D2D scheme is provided. The BS includes a controller configured to perform an operation of determining whether a UE is a legacy UE or a non-legacy UE, an operation of determining non-D2D sub-frames which will collide with D2D sub-frames if the UE is the non-legacy UE, an operation of determining whether the non-D2D sub-frames are available, and an operation of scheduling a new HARQ packet for the UE in the determined non-D2D sub-frames if the determined non-D2D sub-frames are available.

In accordance with still another aspect of the present disclosure, a UE in a communication system supporting a D2D scheme is provided. The UE includes a transmitter, a receiver, and a controller configured to perform an operation of determining whether the UE is a legacy UE or a non-legacy UE, an operation of detecting D2D resource information if the UE is the non-legacy UE, an operation of determining D2D sub-frames based on the D2D resource information, an operation of detecting that a sub-frame for transmission/retransmission of a HARQ packet will collide with the D2D sub-frames while transmitting/retransmitting the HARQ packet, and an operation of skipping the transmission/retransmission of the HARQ packet after detecting that the sub-frame for the transmission/retransmission of the HARQ packet will collide with the D2D sub-frames.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 illustrates a collision between a hybrid automatic repeat request (HARQ) transmission by a user equipment (UE) and a device to device (D2D) transmission by another UE in a communication system supporting a D2D scheme according to the related art;

FIG. 2 illustrates a process of preventing a collision between a HARQ transmission and a D2D transmission based on a HARQ-D2D transmission collision avoidance scheme #1 in a communication system supporting a D2D scheme according to an embodiment of the present disclosure;

FIG. 12A illustrates an operating process in a case that n is set to 1 in a HARQ transmission skip preventing scheme #1 based on a HARQ-D2D transmission collision avoidance scheme #4 in a communication system supporting a D2D scheme according to an embodiment of the present disclosure;

FIG. 12B illustrates an operating process in a case that n is set to 2 in a HARQ transmission skip preventing scheme #1 based on a HARQ-D2D transmission collision avoidance scheme #4 in a communication system supporting a D2D scheme according to an embodiment of the present disclosure;

FIG. 13A illustrates a HARQ transmission skip preventing scheme #2 based on a HARQ-D2D transmission collision avoidance scheme #4 in a communication system supporting a D2D scheme according to an embodiment of the present disclosure;

FIG. 13B illustrates a HARQ transmission skip preventing scheme #2 based on a HARQ-D2D transmission collision avoidance scheme #4 in a communication system supporting a D2D scheme according to an embodiment of the present disclosure;

FIG. 15C illustrates a process of using a sub-frame pattern during a D2D discovery resource interval in a case that a HARQ-D2D transmission collision avoidance scheme #4 is used in a communication system supporting a D2D scheme according to an embodiment of the present disclosure;

FIG. 16 illustrates a sub-frame pattern for a D2D discovery resource interval in a case that a HARQ-D2D transmission collision avoidance scheme #4 is used in a communication system supporting a D2D scheme according to an embodiment of the present disclosure;

FIG. 17 illustrates a sub-frame pattern for a D2D discovery resource interval in a case that a HARQ-D2D transmission collision avoidance scheme #4 is used in a communication system supporting a D2D scheme according to an embodiment of the present disclosure;

FIG. 18 illustrates a HARQ-D2D transmission collision avoidance scheme #5 in a communication system supporting a D2D scheme according to an embodiment of the present disclosure;

Throughout the drawings, it should be noted that like reference numbers are used to depict the same or similar elements, features, and structures.

DETAILED DESCRIPTION

Figure 3:
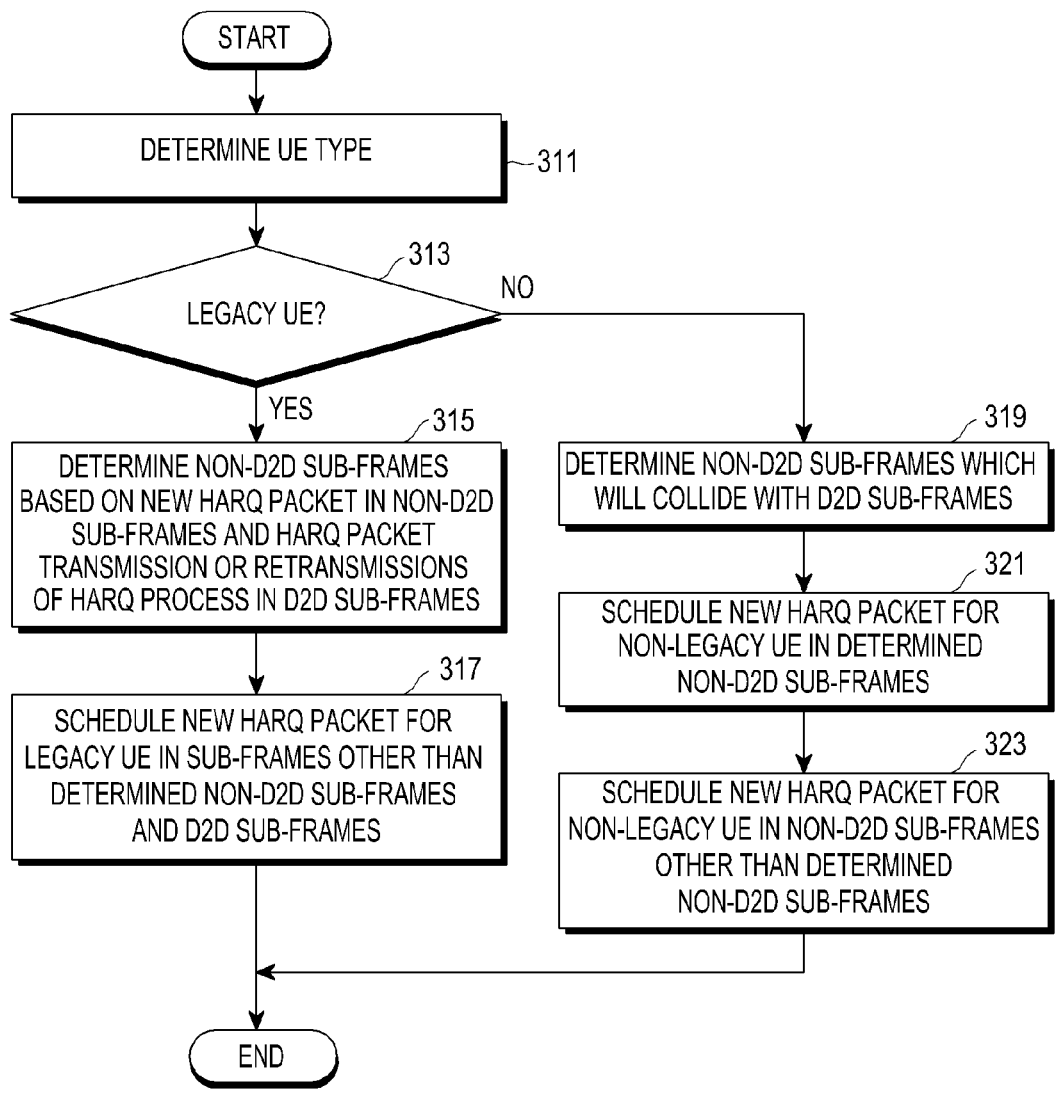
FIG. 3 is a flowchart illustrating an operating process of a base station (BS) in a HARQ-D2D transmission collision avoidance scheme #1 in a communication system supporting a D2D scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Although ordinal numbers, such as "first," "second," and the like, will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a user equipment (UE) may be an electronic device.

An embodiment of the present disclosure proposes an apparatus and a method for avoiding a collision between a hybrid automatic repeat request (HARQ) transmission and a device to device (D2D) transmission in a communication system supporting a D2D scheme.

An embodiment of the present disclosure proposes an apparatus and a method for avoiding a collision between a HARQ transmission and a D2D transmission based on a UE type in a communication system supporting a D2D scheme.

An embodiment of the present disclosure proposes an apparatus and a method for avoiding a collision between a HARQ transmission by a UE and a D2D transmission by another UE based on a resource type in a communication system supporting a D2D scheme.

An embodiment of the present disclosure proposes an apparatus and a method for skipping a HARQ transmission and a HARQ re-transmission based on a UE type in a communication system supporting a D2D scheme.

An embodiment of the present disclosure proposes an apparatus and a method for skipping a HARQ transmission and a HARQ retransmission based on a resource type in a communication system supporting a D2D scheme.

An embodiment of the present disclosure proposes an apparatus and a method for scheduling a HARQ transmission and a HARQ retransmission based on whether there is a collision between a D2D discovery resource and a non-D2D discovery resource in a communication system supporting a D2D scheme.

An embodiment of the present disclosure proposes an apparatus and a method for scheduling a new HARQ transmission based on a UE type in a communication system supporting a D2D scheme.

An embodiment of the present disclosure proposes an apparatus and a method for scheduling a new HARQ transmission based on a resource type in a communication system supporting a D2D scheme.

An embodiment of the present disclosure proposes an apparatus and a method for scheduling a new HARQ transmission based on whether there is a collision between a D2D discovery resource and a non-D2D discovery resource in a communication system supporting a D2D scheme.

A method and apparatus proposed in an embodiment of the present disclosure may be applied to various communication systems, such as an institute of electrical and electronics engineers (IEEE) 802.11ac communication system, an IEEE 802.16 communication system, a digital video broadcasting system, such as a mobile broadcasting service, such as a digital multimedia broadcasting (DMB) service, a digital video broadcasting-handheld (DVP-H) service, an advanced television systems committee-mobile/handheld (ATSC-M/H) service, and the like, and an Internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile Internet protocol (Mobile IP) system, and/or the like.

An embodiment of the present disclosure proposes 7 schemes for collision avoidance between a HARQ transmission by a UE and a D2D transmission by another UE, i.e., a HARQ-D2D transmission collision avoidance scheme #1, a HARQ-D2D transmission collision avoidance scheme #2, a HARQ-D2D transmission collision avoidance scheme #3, a HARQ-D2D transmission collision avoidance scheme #4, a HARQ-D2D transmission collision avoidance scheme #5, a HARQ-D2D transmission collision avoidance scheme #6, and a HARQ-D2D transmission collision avoidance scheme #7, and this will be described below.

Firstly, the HARQ-D2D transmission collision avoidance scheme #1 will be described below.

An operation of a base station (BS) in the HARQ-D2D transmission collision avoidance scheme #1 will be described below.

A BS determines the non-D2D sub-frames such that, if new HARQ packet of a HARQ process is started or scheduled in the determined non-D2D sub-frames, then HARQ packet transmissions or retransmissions of the HARQ process may collide with D2D transmissions in a D2D sub-frame. The BS determines the non-D2D sub-frames based on location of a D2D sub-frame, a retransmission interval (retx_interval), and a maximum transmission number for uplink (UL) HARQ. The retx_interval denotes a time interval between two HARQ packets, i.e., a retransmission interval. The BS does not schedule or start a HARQ process for a new UL HARQ packet for legacy UEs in non-D2D sub-frames. The legacy UEs denotes UEs which do not support D2D feature or do not know the allocated D2D resources, and have no capability of determining the allocated D2D resources. For example, if a D2D scheme is included in a wireless communication standard release x, and a UE is compliant to a release y (y<x), the UE which is compliant to the release y is a legacy UE.

Meanwhile, in a semi persistent scheduling (SPS) scheme which is applied to a UE in a determined non-D2D sub-frame, a BS will terminate or suspend the SPS scheme by transmitting a physical downlink control channel (PDCCH) signal indicating SPS release or suspension for legacy UEs.

A process of preventing a collision between a HARQ transmission and a D2D transmission which is based on a HARQ-D2D transmission collision avoidance scheme #1 in a communication system supporting a D2D scheme will be described with reference to FIG. 2.

FIG. 2 illustrates a process of preventing a collision between a HARQ transmission and a D2D transmission based on a HARQ-D2D transmission collision avoidance scheme #1 in a communication system supporting a D2D scheme according to an embodiment of the present disclosure.

Referring to FIG. 2, for a D2D sub-frame x, a BS determines that HARQ packets of a HARQ process which is started at one of sub-frames x−n*(retx_interval+1) will collide with D2D transmissions which are in a sub-frame x. Here, n denotes an arbitrary integer which is from 1 to N, and N denotes a maximum retransmission number which is allocated to a HARQ packet. In the determined radio frames x−n*(retx_interval+1), the BS does not start or schedule a new UL HARQ packet for legacy UEs. For example, the BS starts or schedules the new UL HARQ packet for the non-legacy UEs in the determined non-D2D sub-frames.

A process of preventing a collision between a HARQ transmission and a D2D transmission based on a HARQ-D2D transmission collision avoidance scheme #1 in a communication system supporting a D2D scheme has been described with reference to FIG. 2, and an example of an operating process of a BS in a HARQ-D2D transmission collision avoidance scheme #1 in a communication system supporting a D2D scheme will be described with reference to FIG. 3.

FIG. 3 is a flowchart illustrating an operating process of a BS in a HARQ-D2D transmission collision avoidance scheme #1 in a communication system supporting a D2D scheme according to an embodiment of the present disclosure.

Referring to FIG. 3, it will be noted that an operating process of a BS in a HARQ-D2D transmission collision avoidance scheme #1 is an operating process of a BS which supports a D2D scheme, and allocates resources for the D2D scheme.

The BS determines a UE type of a UE at operation 311. The BS determines whether the UE is a legacy UE based on the determined UE type at operation 313. The BS determines the UE type of the UE based on UE capability information. Here, the BS may determine UE capability of the UE based on a UE subscription profile, or capability information which is signaled to the BS from the UE.

If the UE is the legacy UE, the BS determines non-D2D sub-frames such that, if a new HARQ packet of a HARQ process is started or scheduled in the determined non-D2D sub-frames, then a HARQ packet transmission or retransmissions of the HARQ process may collide with D2D transmissions in D2D sub-frames at operation 315. For example, the BS determines the non-D2D sub-frames based on the new HARQ packet in the non-D2D sub-frames and the HARQ packet transmission or the retransmissions of the HARQ process in the D2D sub-frames. In an embodiment of the present disclosure, it will be assumed that a D2D sub-frame is a D2D discovery sub-frame, and a non-D2D sub-frame is a non-D2D discovery sub-frame. The BS determines the non-D2D sub-frames based on location of a D2D sub-frame, a retx_interval, and a maximum transmission number for UL HARQ. If there is a need for scheduling a new HARQ packet for the legacy UE, the BS schedules the new HARQ packet for the legacy UE in sub-frames other than the determined non-D2D sub-frames and the D2D sub-frames at operation 317.

If the UE is not the legacy UE, that is, the UE is a non-legacy UE, the BS determines non-D2D sub-frames which will collide with D2D sub-frames at operation 319. The BS determines the non-D2D sub-frames based on location of a D2D sub-frame, a retx_interval, and a maximum transmission number for UL HARQ.

If there is a need for scheduling the new HARQ packet for the non-legacy UE, the BS schedules the new HARQ packet for the non-legacy UE in the determined non-D2D sub-frames at operation 321. If the determined non-D2D sub-frames are already used, the BS schedules the new HARQ packet for the non-legacy UE in non-D2D sub-frames other than the determined non-D2D sub-frames at operation 323.

Although FIG. 3 illustrates an operating process of a BS in a HARQ-D2D transmission collision avoidance scheme #1 in a communication system supporting a D2D scheme, various changes could be made to FIG. 3. For example, although shown as a series of operations, various operations in FIG. 3 could overlap, occur in parallel, occur in a different order, or occur multiple times.

An example of an operating process of a BS in a HARQ-D2D transmission collision avoidance scheme #1 in a communication system supporting a D2D scheme has been described with reference to FIG. 3, and another example of an operating process of a BS in a HARQ-D2D transmission collision avoidance scheme #1 in a communication system supporting a D2D scheme will be described with reference to FIG. 4.

Figure 4:
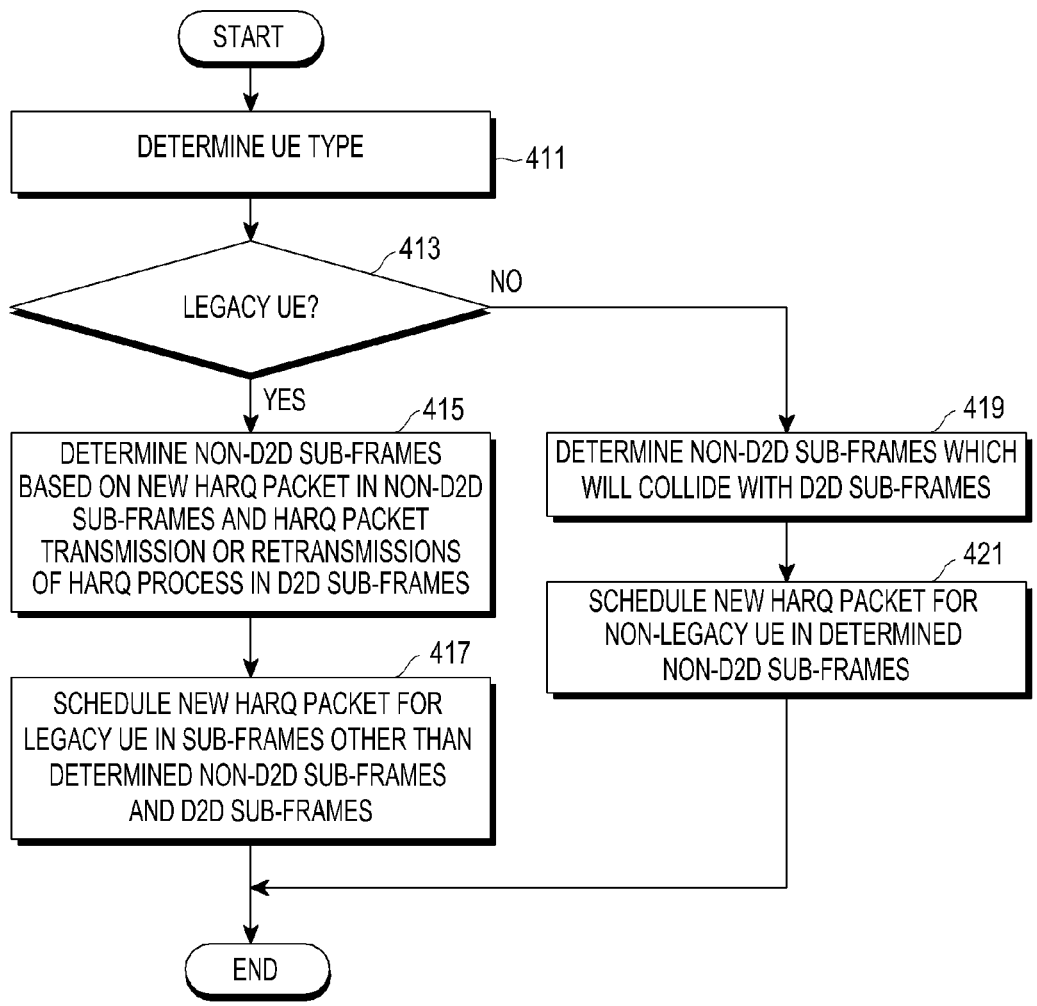
FIG. 4 is a flowchart illustrating an operating process of a BS in a HARQ-D2D transmission collision avoidance scheme #1 in a communication system supporting a D2D scheme according to an embodiment of the present disclosure.

FIG. 4 is a flowchart illustrating an operating process of a BS in a HARQ-D2D transmission collision avoidance scheme #1 in a communication system supporting a D2D scheme according to an embodiment of the present disclosure.

Referring to FIG. 4, it will be noted that an operating process of a BS in a HARQ-D2D transmission collision avoidance scheme #1 is an operating process of a BS which supports a D2D scheme, and allocates resources for the D2D scheme.

The BS determines a UE type of a UE at operation 411. The BS determines whether the UE is a legacy UE based on the determined UE type at operation 413. Here, the BS determines the UE type of the UE based on UE capability information. The BS may determine UE capability of the UE based on a UE subscription profile, or capability information which is signaled to the BS from the UE.

If the UE is the legacy UE, the BS determines non-D2D sub-frames such that, if new HARQ packet of a HARQ process is started or scheduled in the determined non-D2D sub-frames, then a HARQ packet transmission or retransmissions of the HARQ process may collide with D2D transmissions in D2D sub-frames at operation 415. For example, the BS determines the non-D2D sub-frames based on the new HARQ packet in the non-D2D sub-frames and the HARQ packet transmission or the retransmissions of the HARQ process in the D2D sub-frames. In an embodiment of the present disclosure, it will be assumed that a D2D sub-frame is a D2D discovery sub-frame, and a non-D2D sub-frame is a non-D2D discovery sub-frame. The BS determines the non-D2D sub-frames based on location of a D2D sub-frame, a retx_interval, and a maximum transmission number for UL HARQ. If there is a need for scheduling a new HARQ packet for the legacy UE, the BS schedules the new HARQ packet for the legacy UE in sub-frames other than the determined non-D2D sub-frames and the D2D sub-frames at operation 417.

If the UE is not the legacy UE, that is, the UE is a non-legacy UE, the BS determines non-D2D sub-frames which will collide with D2D sub-frames at operation 419. The BS determines the non-D2D sub-frames based on location of a D2D sub-frame, a retx_interval, and a maximum transmission number for UL HARQ.

If there is a need for scheduling the new HARQ packet for the non-legacy UE, the BS schedules the new HARQ packet for the non-legacy UE in any non-D2D sub-frames at operation 421.

Although FIG. 4 illustrates another example of an operating process of a BS in a HARQ-D2D transmission collision avoidance scheme #1 in a communication system supporting a D2D scheme, various changes could be made to FIG. 4. For example, although shown as a series of operations, various operations in FIG. 4 could overlap, occur in parallel, occur in a different order, or occur multiple times.

Meanwhile, in an embodiment of the present disclosure, a HARQ-D2D transmission collision avoidance scheme #1 may be applied by a BS to D2D discovery sub-frames which are configured within a cell which the BS manages.

The HARQ-D2D transmission collision avoidance scheme #1 may be applied by the BS to D2D communication sub-frames which are configured within the cell which the BS manages.

The HARQ-D2D transmission collision avoidance scheme #1 may be applied by the BS to all of the D2D discovery sub-frames and the D2D communication sub-frames which are configured within the cell which the BS manages.

The HARQ-D2D transmission collision avoidance scheme #1 may be applied by the BS to D2D discovery sub-frames which are configured within the cell which the BS manages and D2D discovery sub-frames configured in the neighbor cells.

The HARQ-D2D transmission collision avoidance scheme #1 may be applied by the BS to D2D communication sub-frames which are configured within the cell which the BS manages and the D2D communication sub-frames configured in the neighbor cells.

The HARQ-D2D transmission collision avoidance scheme #1 may be applied by the BS to all of the D2D discovery sub-frames and the D2D communication sub-frames which are configured within the cell which the BS manages and all of the D2D discovery sub-frames and the D2D communication sub-frames which are configured in the neighbor cells.

An operating process of a UE in a HARQ-D2D transmission collision avoidance scheme #1 in a communication system supporting a D2D scheme will be described with reference to FIG. 5.

Figure 5:
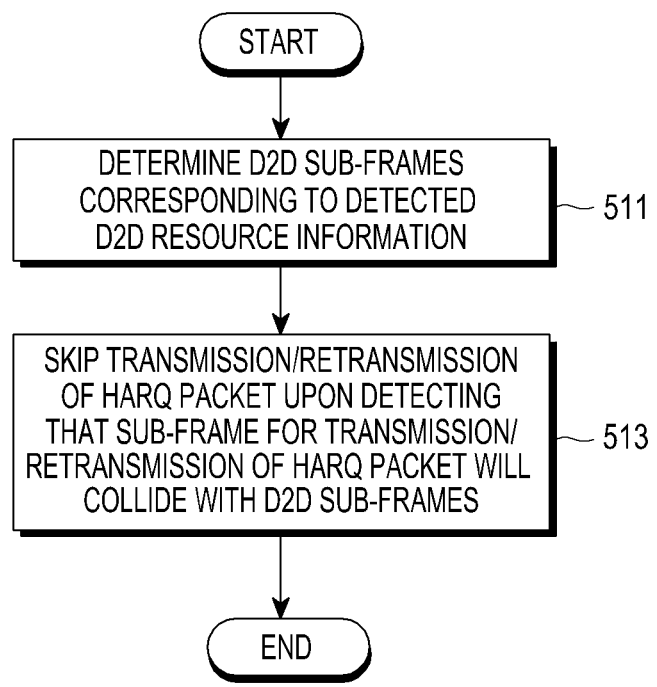
FIG. 5 is a flowchart illustrating an operating process of a UE in a HARQ-D2D transmission collision avoidance scheme #1 in a communication system supporting a D2D scheme according to an embodiment of the present disclosure.

FIG. 5 is a flowchart illustrating an operating process of a UE in a HARQ-D2D transmission collision avoidance scheme #1 in a communication system supporting a D2D scheme according to an embodiment of the present disclosure.

Referring to FIG. 5, a UE obtains D2D resource information by reading system information broadcasted by a BS and determines D2D sub-frames corresponding to detected D2D resource information at operation 511.

If the UE detects that a sub-frame for transmission/retransmission of a HARQ packet will collide with D2D sub-frames during a transmission/retransmission of the HARQ packet, the UE skips the transmission/retransmission of the HARQ packet at operation 513.

Although FIG. 5 illustrates an operating process of a UE in a HARQ-D2D transmission collision avoidance scheme #1 in a communication system supporting a D2D scheme, various changes could be made to FIG. 5. For example, although shown as a series of operations, various operations in FIG. 5 could overlap, occur in parallel, occur in a different order, or occur multiple times.

Meanwhile, in an embodiment of the present disclosure, a HARQ-D2D transmission collision avoidance scheme #1 may be applied by a UE to D2D discovery sub-frames within a serving cell of the UE.

The HARQ-D2D transmission collision avoidance scheme #1 may be applied by the UE to D2D communication sub-frames within the serving cell of the UE.

The HARQ-D2D transmission collision avoidance scheme #1 may be applied by the UE to all of the D2D discovery sub-frames and the D2D communication sub-frames within the serving cell of the UE.

The HARQ-D2D transmission collision avoidance scheme #1 may be applied by the UE to D2D discovery sub-frames within the serving cell of the UE and D2D discovery sub-frames configured in the neighbor cells.

The HARQ-D2D transmission collision avoidance scheme #1 may be applied by the UE to D2D communication sub-frames within the serving cell of the UE and D2D communication sub-frames of the neighbor cells.

The HARQ-D2D transmission collision avoidance scheme #1may be applied by the UE to all of the D2D discovery sub-frames and the D2D communication sub-frames within the serving cell of the UE and the neighbor cells.

If some resources in a sub-frame instead of all resources in a sub-frame are reserved for a D2D scheme, the HARQ-D2D transmission collision avoidance scheme #1 may also be applied. In this case, the HARQ-D2D transmission collision avoidance scheme #1 is applied if a D2D sub-frame collides with a HARQ sub-frame, and resources for a HARQ packet in the D2D sub-frame collide with D2D resources in that subframe.

A HARQ-D2D transmission collision avoidance scheme #1 in a communication system supporting a D2D has been described with reference to FIGS. 2 to 5, and a HARQ-D2D transmission collision avoidance scheme #2 in a communication system supporting a D2D scheme will be described with reference to FIGS. 6 and 7.

An operating process of a BS in the HARQ-D2D transmission collision avoidance scheme #2 will be described below.

A BS determines non-D2D sub-frames such that, if new HARQ packet of a HARQ process is started or scheduled in a non-D2D sub-frame, then HARQ packet transmission/retransmissions of HARQ process may collide with D2D transmissions which are in a D2D sub-frame. The BS determines the non-D2D sub-frames based on location of a D2D sub-frame, a retx_interval, and a maximum transmission number for UL HARQ. The BS does not start or schedule transmission for a new UL HARQ packet in the determined non-D2D sub-frames for a UE. In an SPS scheme which is applied to a UE in the determined non-D2D sub-frames, the BS will terminate the SPS scheme by transmitting a PDCCH signal through an SPS release.

In an embodiment of the present disclosure, a HARQ-D2D transmission collision avoidance scheme #2 may be applied to D2D discovery sub-frames.

The HARQ-D2D transmission collision avoidance scheme #2 may be applied to D2D communication sub-frames.

The HARQ-D2D transmission collision avoidance scheme #2 may be applied to all of the D2D discovery sub-frames and the D2D communication sub-frames.

A process of preventing a collision between a HARQ transmission and a D2D transmission based on a HARQ-D2D transmission collision avoidance scheme #2 in a communication system supporting a D2D scheme will be described with reference to FIG. 6.

Figure 6:
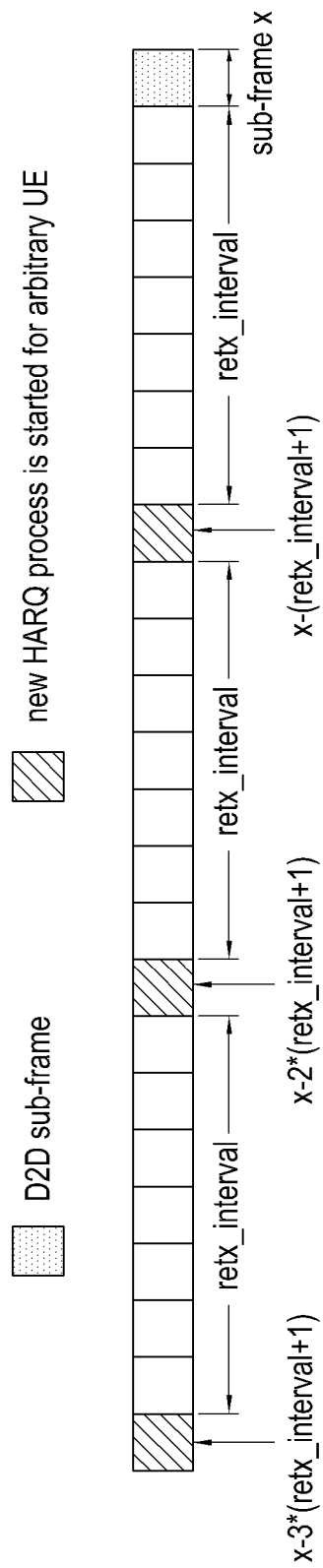
FIG. 6 illustrates a process of preventing a collision between a HARQ transmission by a UE and a D2D transmission by another UE based on a HARQ-D2D transmission collision avoidance scheme #2 in a communication system supporting a D2D scheme according to an embodiment of the present disclosure.

FIG. 6 illustrates a process of preventing a collision between a HARQ transmission and a D2D transmission based on a HARQ-D2D transmission collision avoidance scheme #2 in a communication system supporting a D2D scheme according to an embodiment of the present disclosure.

Referring to FIG. 6, for a D2D sub-frame x, a BS determines that HARQ packets of a HARQ process which is started at one of sub-frames x−n*(retx_interval+1) will collide with D2D transmissions which are in a sub-frame x. Here, n denotes an arbitrary integer which is from 1 to N, and N denotes a maximum retransmission number which is allocated to a HARQ packet. In the determined radio frames x−n*(retx_interval+1), the BS does not start or schedule a HARQ process for a new UL HARQ packet for any UE.

A process of preventing a collision between a HARQ transmission and a D2D transmission based on a HARQ-D2D transmission collision avoidance scheme #2 in a communication system supporting a D2D scheme has been described with reference to FIG. 6, and an operating process of a BS in a HARQ-D2D transmission collision avoidance scheme #2 in a communication system supporting a D2D scheme will be described with reference to FIG. 7.

Figure 7:
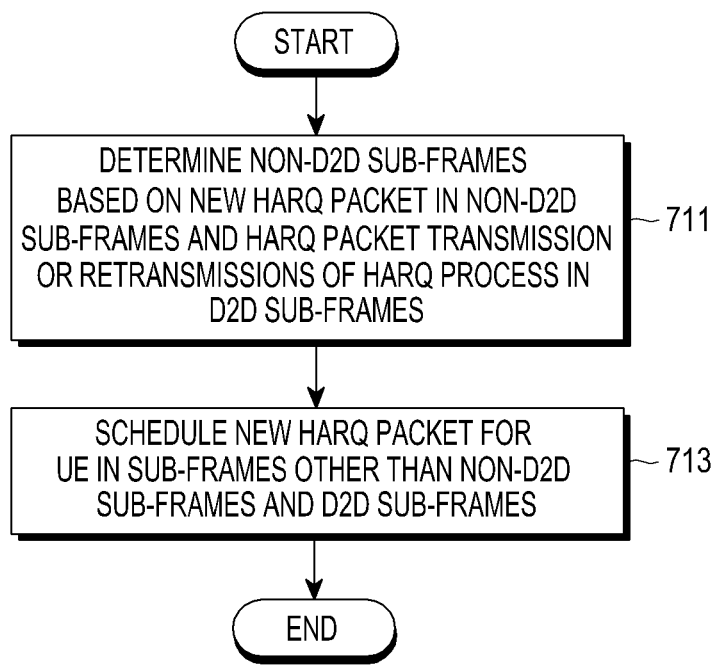
FIG. 7 is a flowchart illustrating an operating process of a BS in a HARQ-D2D transmission collision avoidance scheme #2 in a communication system supporting a D2D scheme according to an embodiment of the present disclosure.

FIG. 7 is a flowchart illustrating an operating process of a BS in a HARQ-D2D transmission collision avoidance scheme #2 in a communication system supporting a D2D scheme according to an embodiment of the present disclosure.

Referring to FIG. 7, it will be noted that an operating process of a BS in a HARQ-D2D transmission collision avoidance scheme #2 is an operating process of a BS which supports a D2D scheme, and allocates resources for the D2D scheme.

The BS determines non-D2D sub-frames such that, if a new HARQ packet of a HARQ process is started or scheduled in determining the non-D2D sub-frames, then a HARQ packet transmission or retransmissions of the HARQ process may collide with D2D transmissions which are in D2D sub-frames at operation 711. For example, the BS determines the non-D2D sub-frames based on the new HARQ packet in the non-D2D sub-frames and the HARQ packet transmission or the retransmissions of the HARQ process in the D2D sub-frames. For example, the D2D sub-frames are D2D discovery sub-frames, and the non-D2D sub-frames may be non-D2D discovery sub-frames. The BS determines the non-D2D sub-frames based on location of a D2D sub-frame, a retx_interval, and a maximum transmission number for UL HARQ.

Upon detecting that there is a need for scheduling a new HARQ packet to a UE, the BS schedules the new HARQ packet for the UE in sub-frames other than the determined non-D2D sub-frames and the D2D sub-frames at operation 713.

Although FIG. 7 illustrates an operating process of a BS in a HARQ-D2D transmission collision avoidance scheme #2 in a communication system supporting a D2D scheme, various changes could be made to FIG. 7. For example, although shown as a series of operations, various operations in FIG. 7 could overlap, occur in parallel, occur in a different order, or occur multiple times.

In an embodiment of the present disclosure, a HARQ-D2D transmission collision avoidance scheme #2 may be applied by a BS to D2D discovery sub-frames which are configured within a cell which the BS manages.

The HARQ-D2D transmission collision avoidance scheme #2 may be applied by the BS to D2D communication sub-frames which are configured within the cell which the BS manages.

The HARQ-D2D transmission collision avoidance scheme #2 may be applied by the BS to all of the D2D discovery sub-frames and the D2D communication sub-frames which are configured within the cell which the BS manages.

The HARQ-D2D transmission collision avoidance scheme #2 may be applied by the BS to D2D discovery sub-frames which are configured within the cell which the BS manages and D2D discovery sub-frames which are configured in the neighbor cells.

The HARQ-D2D transmission collision avoidance scheme #2 may be applied by the BS to D2D communication sub-frames which are configured within the cell which the BS manages and D2D communication sub-frames which are configured in the neighbor cells.

The HARQ-D2D transmission collision avoidance scheme #2 may be applied by the BS to all of the D2D discovery sub-frames and the D2D communication sub-frames which are configured within the cell which the BS manages and the neighbor cells.

Meanwhile, an operation of a UE in a case that a HARQ-D2D transmission collision avoidance scheme #2 is applied is identical to an operation of a UE in a case that the HARQ-D2D transmission collision avoidance scheme #2 is not applied, and a detailed description will be omitted herein.

Even though some resources in a sub-frame instead of all resources in a sub-frame are reserved for a D2D scheme, the HARQ-D2D transmission collision avoidance scheme #2 may also be applied. In this case, the HARQ-D2D transmission collision avoidance scheme #2 is applied if a D2D sub-frame collides with a HARQ sub-frame, and resources for a HARQ packet collide with D2D resources in the D2D sub-frame.

A HARQ-D2D transmission collision avoidance scheme #2 in a communication system supporting a D2D scheme has been described with reference to FIGS. 6 and 7, and a HARQ-D2D transmission collision avoidance scheme #3 in a communication system supporting a D2D scheme will be described with reference to FIGS. 8 and 9.

An operating process of a BS in the HARQ-D2D transmission collision avoidance scheme #3 will be described below.

Firstly, for preventing a collision between a HARQ transmission and a D2D transmission, a HARQ feedback operation in a BS is changed. If a UL HARQ packet is not received successfully, the BS determines whether a sub-frame where the UL HARQ packet will be retransmitted by a UE will collide with a D2D sub-frame. If the sub-frame where the UL HARQ packet will be retransmitted collides with the D2D sub-frame, the BS transmits a HARQ acknowledgement (ACK) signal instead of a HARQ negative acknowledgement (NACK) signal. The BS will not transmit a PDCCH signal for resource adaptation for this retransmission.

A process of preventing a collision between a HARQ transmission and a D2D transmission based on a HARQ-D2D transmission collision avoidance scheme #3 in a communication system supporting a D2D scheme will be described with reference to FIG. 8.

Figure 8:
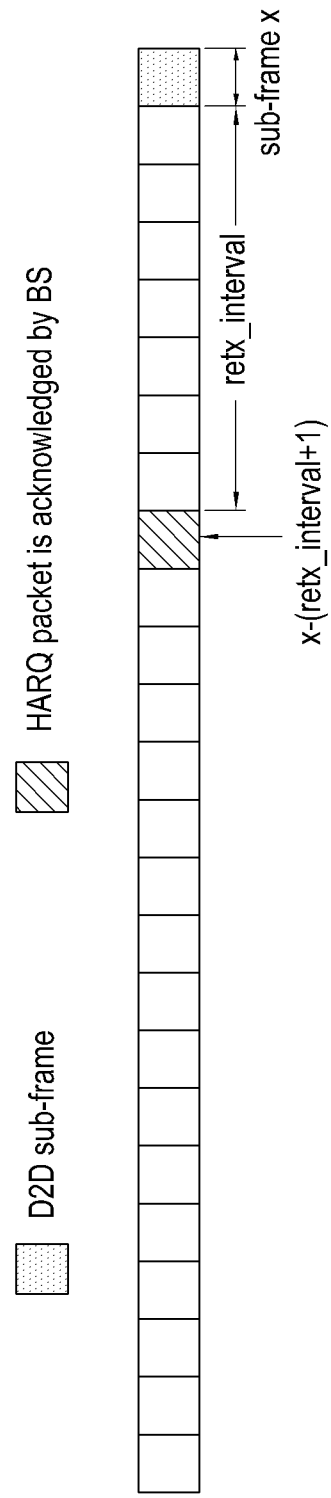
FIG. 8 illustrates a process of preventing a collision between a HARQ transmission and a D2D transmission based on a HARQ-D2D transmission collision avoidance scheme #3 in a communication system supporting a D2D scheme according to an embodiment of the present disclosure.

FIG. 8 illustrates a process of preventing a collision between a HARQ transmission and a D2D transmission based on a HARQ-D2D transmission collision avoidance scheme #3 in a communication system supporting a D2D scheme according to an embodiment of the present disclosure.

Referring to FIG. 8, for a D2D sub-frame x, a BS transmits a HARQ ACK signal for a HARQ packet in a sub-frame x−(retx_interval+1).

A process of preventing a collision between a HARQ transmission and a D2D transmission based on a HARQ-D2D transmission collision avoidance scheme #3 in a communication system supporting a D2D scheme has been described with reference to FIG. 8, and an operating process of a BS in a HARQ-D2D transmission collision avoidance scheme #3 in a communication system supporting a D2D scheme will be described with reference to FIG. 9.

Figure 9:
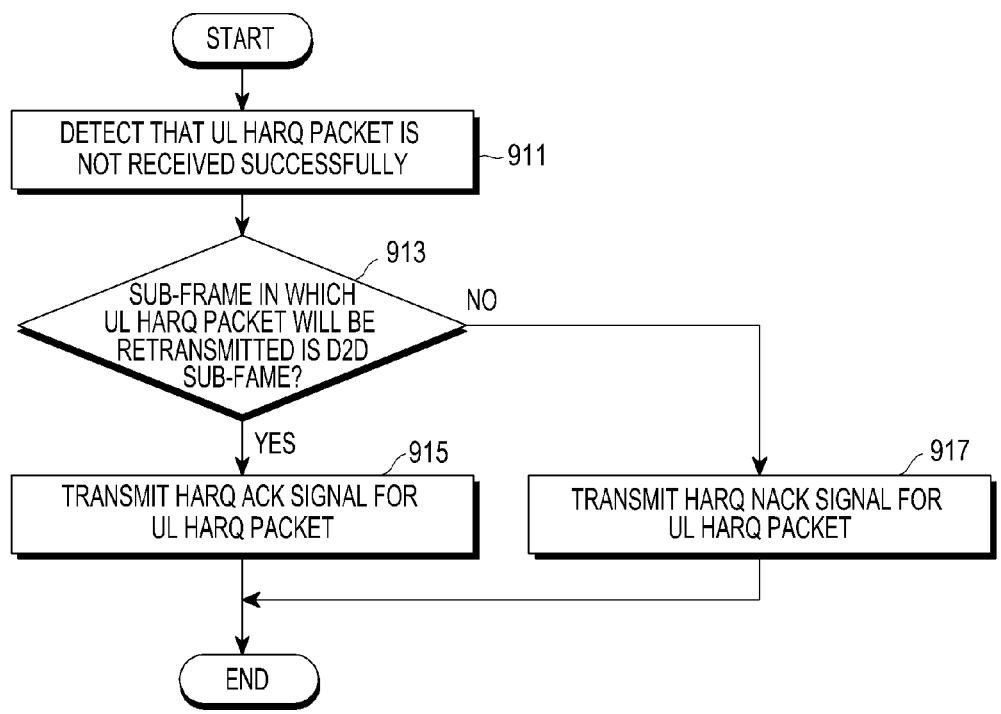
FIG. 9 is a flowchart illustrating an operating process of a BS in a HARQ-D2D transmission collision avoidance scheme #3 in a communication system supporting a D2D scheme according to an embodiment of the present disclosure.

FIG. 9 is a flowchart illustrating an operating process of a BS in a HARQ-D2D transmission collision avoidance scheme #3 in a communication system supporting a D2D scheme according to an embodiment of the present disclosure.

Referring to FIG. 9, the BS detects that a UL HARQ packet (except for the last HARQ packet of a HARQ process) is not received successfully in a sub-frame at operation 911. The BS determines whether a sub-frame in which the UE will retransmit the HARQ packet is a D2D sub-frame at operation 913. If the sub-frame in which the UE will retransmit the UL HARQ packet is a D2D sub-frame, the BS transmits a HARQ ACK signal to the UE for the UL HARQ packet which is not received successfully at operation 915.

If the sub-frame in which the UE will retransmit the UL HARQ packet is not the D2D sub-frame, the BS transmits a HARQ NACK signal to the UE for the UL HARQ packet which is not received successfully at operation 917.

Although FIG. 9 illustrates an operating process of a BS in a HARQ-D2D transmission collision avoidance scheme #3 in a communication system supporting a D2D scheme, various changes could be made to FIG. 9. For example, although shown as a series of operations, various operations in FIG. 9 could overlap, occur in parallel, occur in a different order, or occur multiple times.

Even though some resources in a sub-frame instead of all resources in a sub-frame are reserved for a D2D scheme, the HARQ-D2D transmission collision avoidance scheme #3 may also be applied. In this case, the HARQ-D2D transmission collision avoidance scheme #3 is applied if a D2D sub-frame collides with a HARQ sub-frame, and resources for a HARQ packet in the D2D sub-frame collide with D2D resources in the D2D sub-frame.

Meanwhile, in an embodiment of the present disclosure, a HARQ-D2D transmission collision avoidance scheme #3 may be applied by a BS to D2D discovery sub-frames which are configured within a cell which the BS manages.

The HARQ-D2D transmission collision avoidance scheme #3 may be applied by the BS to D2D communication sub-frames which are configured within the cell which the BS manages.

The HARQ-D2D transmission collision avoidance scheme #3 may be applied by the BS to all of the D2D discovery sub-frames and the D2D communication sub-frames which are configured within the cell which the BS manages.

The HARQ-D2D transmission collision avoidance scheme #3 may be applied by the BS to D2D discovery sub-frames which are configured within the cell which the BS manages and D2D discovery sub-frames which are configured in the neighbor cells.

The HARQ-D2D transmission collision avoidance scheme #3 may be applied by the BS to D2D communication sub-frames which are configured within the cell which the BS manages and the D2D communication sub-frames which are configured in the neighbor cells.

The HARQ-D2D transmission collision avoidance scheme #3 may be applied by the BS to all of the D2D discovery sub-frames and the D2D communication sub-frames which are configured within the cell which the BS manages and the all of the D2D discovery sub-frames and the D2D communication sub-frames in the neighbor cells.

Meanwhile, an operation of a UE in a case that a HARQ-D2D transmission collision avoidance scheme #3 is applied is identical to an operation of a UE in a case that the HARQ-D2D transmission collision avoidance scheme #3 is not applied, and a detailed description will be omitted herein.

An operation of a legacy UE in a case that a HARQ-D2D transmission collision avoidance scheme #3 is applied is identical to an operation of the legacy UE in a case that the HARQ-D2D transmission collision avoidance scheme #3 is not applied, and an operation of a non-legacy UE in a case that the HARQ-D2D transmission collision avoidance scheme #3 is applied may be identical to an operation of the non-legacy UE in a case that a HARQ-D2D transmission collision avoidance scheme #1 is applied, so detailed description will be omitted herein.

A HARQ-D2D transmission collision avoidance scheme #3 in a communication system supporting a D2D scheme has been described with reference to FIGS. 8 and 9, and a HARQ-D2D transmission collision avoidance scheme #4 in a communication system supporting a D2D scheme will be described with reference to FIGS. 10 to 17.

An operating process of a BS in the HARQ-D2D transmission collision avoidance scheme #4 will be described below.

If there are legacy UEs which communicate with a BS, the BS prevents a collision between a D2D transmission by a UE and a HARQ transmission by the legacy UEs in the manner described as a HARQ-D2D transmission collision avoidance scheme #1. The BS determines non-D2D sub-frames such that HARQ packets of a HARQ process which is started at one of the non-D2D sub-frames will collide with D2D transmissions which are in a D2D sub-frame. Therefore, the BS does not start a HARQ process for any new UL HARQ packets in the determined non-D2D sub-frames for the legacy UEs.

Alternatively, in the HARQ-D2D transmission collision avoidance scheme #4, if there are the legacy UEs which communicate with the BS, the BS prevents a collision between a D2D transmission by UEs and a HARQ transmission by the legacy UEs in the manner described as a HARQ-D2D transmission collision avoidance scheme #3. If a UL HARQ packet is not successfully received through a scheduled sub-frame, the BS determines whether a sub-frame in which the UL HARQ packet will be retransmitted by the UE will collide with a D2D sub-frame. If the sub-frame in which the UL HARQ packet will be retransmitted by the UE collides with the D2D sub-frame, the BS transmits a HARQ ACK signal instead of a HARQ NACK signal.

A process of preventing a collision between a HARQ transmission by a UE and a D2D transmission by another UE based on a HARQ-D2D transmission collision avoidance scheme #4 in a communication system supporting a D2D scheme will be described with reference to FIG. 10.

Figure 10:
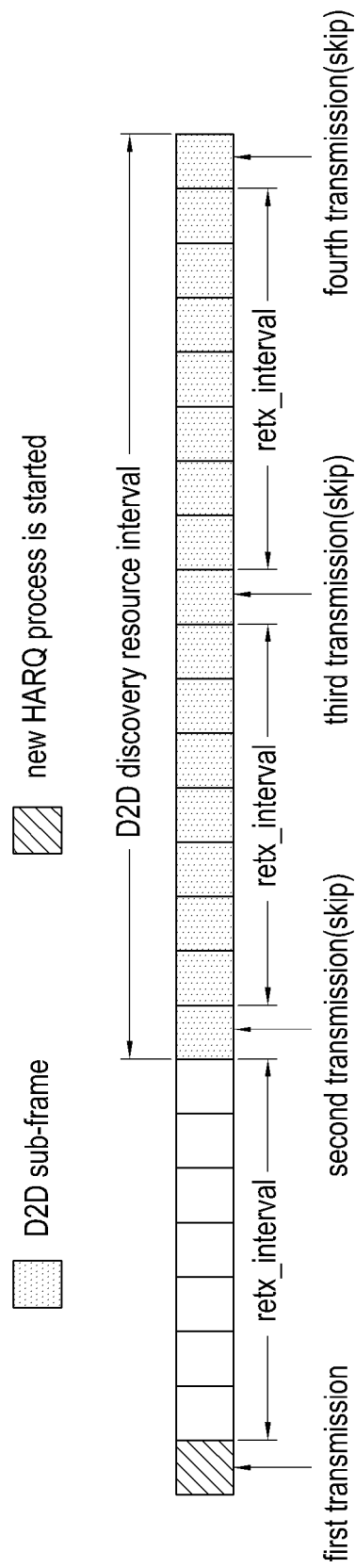
FIG. 10 illustrates a process of preventing a collision between a HARQ transmission and a D2D transmission based on a HARQ-D2D transmission collision avoidance scheme #4 in a communication system supporting a D2D scheme according to an embodiment of the present disclosure.

FIG. 10 illustrates a process of preventing a collision between a HARQ transmission by a UE and a D2D transmission by another UE based on a HARQ-D2D transmission collision avoidance scheme #4 in a communication system supporting a D2D scheme according to an embodiment of the present disclosure.

Referring to FIG. 10, a UE (e.g., a non-legacy UE) which communicates with a BS prevents a collision between a D2D transmission by other UEs and a HARQ transmission by the UE based on a HARQ-D2D transmission collision avoidance scheme #1. The UE skips a transmission or retransmission of a HARQ packet if a sub-frame and frequency resources in the sub-frame for the transmission or retransmission of the HARQ packet collides with D2D sub-frame and frequency resources in the D2D sub-frame during the transmission or retransmission of the HARQ packet.

Further, some sub-frames which correspond to retransmissions of a HARQ packet may collide with a D2D sub-frame. Therefore, as described in FIG. 10, the retransmissions of the HARQ packet should be skipped. The skip for the retransmissions of the HARQ packet may occur for some HARQ packets which are started at a timing point at which D2D sub-frames are started.

For preventing a skip for some transmissions of HARQ packets of a HARQ process, schemes of reserving a sub-frame for a D2D scheme are proposed in an embodiment of the present disclosure, and this will be described below.

Firstly, an example of a HARQ transmission skip preventing scheme #1 based on a HARQ-D2D transmission collision avoidance scheme #4 in a communication system supporting a D2D scheme will be described with reference to FIG. 11A.

Figure 11A:
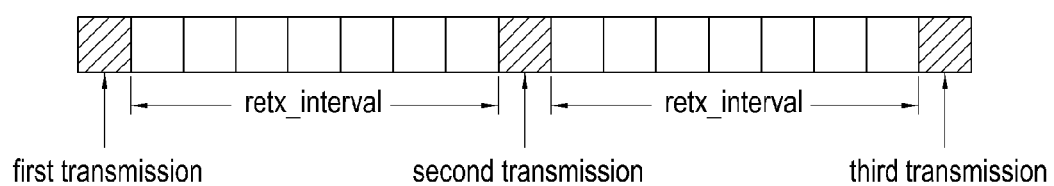
FIG. 11A illustrates a HARQ transmission skip preventing scheme #1 based on a HARQ-D2D transmission collision avoidance scheme #4 in a communication system supporting a D2D scheme according to an embodiment of the present disclosure.

FIG. 11A illustrates a HARQ transmission skip preventing scheme #1 based on a HARQ-D2D transmission collision avoidance scheme #4 in a communication system supporting a D2D scheme according to an embodiment of the present disclosure.

Referring to FIG. 11A, a D2D discovery resource interval is set as an interval which is shorter than or equal to n*(retx_interval+1) (a D2D discovery resource interval <=n*(retx_interval+1)). Here, n denotes the number of retransmissions of a related HARQ packet that may be skipped. A value of the n may be set according to a situation of the communication system, may be a fixed value, or may be signaled from a network, e.g., a BS to a UE.

Referring to FIG. 11A, a retx_interval includes sub-frames which exist between two HARQ packet transmissions.

An example of a HARQ transmission skip preventing scheme #1 based on a HARQ-D2D transmission collision avoidance scheme #4 in a communication system supporting a D2D scheme has been described with reference to FIG. 11A, and another example of a HARQ transmission skip preventing scheme #1 based on a HARQ-D2D transmission collision avoidance scheme #4 in a communication system supporting a D2D scheme will be described with reference to FIG. 11B.

Figure 11B:
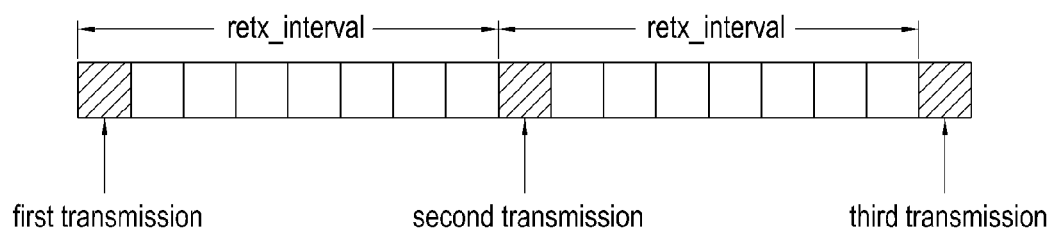
FIG. 11B illustrates a HARQ transmission skip preventing scheme #1 based on a HARQ-D2D transmission collision avoidance scheme #4 in a communication system supporting a D2D scheme according to an embodiment of the present disclosure.

FIG. 11B illustrates a HARQ transmission skip preventing scheme #1 based on a HARQ-D2D transmission collision avoidance scheme #4 in a communication system supporting a D2D scheme according to an embodiment of the present disclosure.

Referring to FIG. 11B, if a retx_interval is set as described in FIG. 11B, a D2D discovery resource interval is set as an interval which is shorter than or equal to n*(retx_interval) (a D2D discovery resource interval <=n*(retx_interval)). Here, n denotes the number of retransmissions of a related HARQ packet that may be skipped. A value of the n may be set according to a situation of the communication system, may be a fixed value, or may be signaled from a network, e.g., a BS to a UE. Referring to FIG. 11B, a retx_interval includes sub-frames which exist between two HARQ packet transmissions and a sub-frame of a HARQ packet transmission.

Another example of a HARQ transmission skip preventing scheme #1 based on a HARQ-D2D transmission collision avoidance scheme #4 in a communication system supporting a D2D scheme has been described with reference to FIG. 11B, and an operating process in a case that n is set to 1 in a HARQ transmission skip preventing scheme #1 based on a HARQ-D2D transmission collision avoidance scheme #4 in a communication system supporting a D2D scheme will be described with reference to FIG. 12A.

FIG. 12A illustrates an operating process in a case that n is set to 1 in a HARQ transmission skip preventing scheme #1 based on a HARQ-D2D transmission collision avoidance scheme #4 in a communication system supporting a D2D scheme according to an embodiment of the present disclosure.

Referring to FIG. 12A, if a retx_interval is set as described in FIG. 12A, n is set to 1. For example, a retransmission for a related HARQ packet is skipped one time in FIG. 12A. A D2D discovery resource interval includes a sub-frame that a retransmission for a related HARQ packet is skipped and a retx_interval next to the sub-frame that the retransmission for the related HARQ packet is skipped.

An operating process in a case that n is set to 1 in a HARQ transmission skip preventing scheme #1 based on a HARQ-D2D transmission collision avoidance scheme #4 in a communication system supporting a D2D scheme has been described with reference to FIG. 12A, and an operating process in a case that n is set to 2 in a HARQ transmission skip preventing scheme #1 based on a HARQ-D2D transmission collision avoidance scheme #4 in a communication system supporting a D2D scheme will be described with reference to FIG. 12B.

FIG. 12B illustrates an operating process in a case that n is set to 2 in a HARQ transmission skip preventing scheme #1 based on a HARQ-D2D transmission collision avoidance scheme #4 in a communication system supporting a D2D scheme according to an embodiment of the present disclosure.

Referring to FIG. 12B, if a retx_interval is set as described in FIG. 12B, n is set to 2. For example, a retransmission for a related HARQ packet is skipped twice in FIG. 12B. A D2D discovery resource interval includes a sub-frame that a retransmission for a related HARQ packet is skipped and a retx_interval next to the sub-frame that the retransmission for the related HARQ packet is skipped.

An operating process in a case that n is set to 2 in a HARQ transmission skip preventing scheme #1 based on a HARQ-D2D transmission collision avoidance scheme #4 in a communication system supporting a D2D scheme has been described with reference to FIG. 12B, and an example of a HARQ transmission skip preventing scheme #2 based on a HARQ-D2D transmission collision avoidance scheme #4 in a communication system supporting a D2D scheme will be described with reference to FIG. 13A.

FIG. 13A illustrates a HARQ transmission skip preventing scheme #2 based on a HARQ-D2D transmission collision avoidance scheme #4 in a communication system supporting a D2D scheme according to an embodiment of the present disclosure.

Referring to FIG. 13A, if a sub-frame x is a D2D discovery sub-frame, sub-frames n*(x+retx_interval+1) should not be used as D2D discovery sub-frames, and sub-frames n*(x−retx_interval−1) should not be used as D2D discovery sub-frames. Here, n denotes the number that retransmissions for a related HARQ packet may be skipped, and a retx_interval may be set as described in FIG. 11A. A value of the n may be set according to a situation of the communication system, may be a fixed value, or may be signaled from a network, e.g., a BS to a UE.

An example of a HARQ transmission skip preventing scheme #2 based on a HARQ-D2D transmission collision avoidance scheme #4 in a communication system supporting a D2D scheme has been described with reference to FIG. 13A, and another example of a HARQ transmission skip preventing scheme #2 based on a HARQ-D2D transmission collision avoidance scheme #4 in a communication system supporting a D2D scheme will described with reference to FIG. 13B.

FIG. 13B illustrates a HARQ transmission skip preventing scheme #2 based on a HARQ-D2D transmission collision avoidance scheme #4 in a communication system supporting a D2D scheme according to an embodiment of the present disclosure.

Referring to FIG. 13B, if a HARQ-D2D transmission collision avoidance scheme #4 is applied to each of D2D sub-frames included in a D2D discovery resource interval, D2D discovery sub-frames included in the D2D discovery resource interval may set as described in FIG. 13B.

Although not shown in any figures, in a case that a retx_interval is set as described in FIG. 11B, if a sub-frame x is a D2D discovery sub-frame, sub-frames n*(x+retx_interval) should not be used as D2D discovery sub-frames, and sub-frames n*(x−retx_interval) should not be used as D2D discovery sub-frames. Here, n denotes the number that retransmissions for a related HARQ packet may be skipped.

Figure 14A:
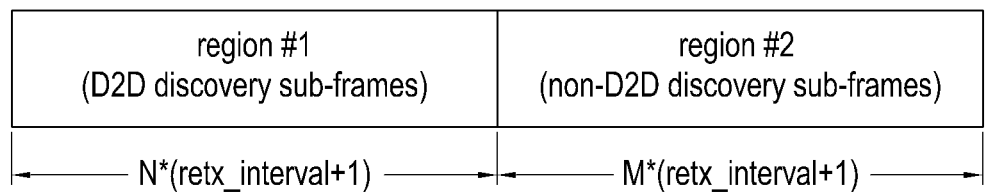
FIG. 14A illustrates a sub-frame pattern for a D2D discovery resource interval in a case that a HARQ-D2D transmission collision avoidance scheme #4 is used in a communication system supporting a D2D scheme according to an embodiment of the present disclosure.
Figure 14B:
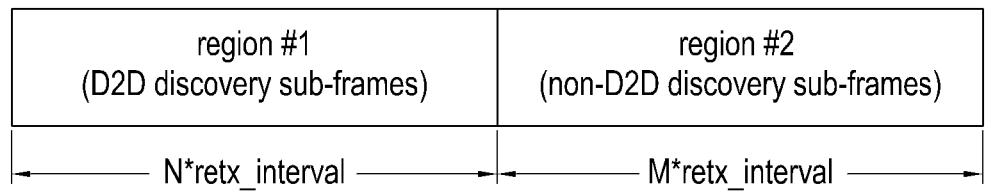
FIG. 14B illustrates a sub-frame pattern for a D2D discovery resource interval in a case that a HARQ-D2D transmission collision avoidance scheme #4 is used in a communication system supporting a D2D scheme according to an embodiment of the present disclosure.

Meanwhile, a sub-frame pattern for a D2D discovery resource interval in a case that a HARQ-D2D transmission collision avoidance scheme #4 is used, i.e., a sub-frame pattern which indicates a relation between a D2D discovery sub-frame and a non-D2D discovery sub-frame may be set with various forms, and a sub-frame pattern for a D2D discovery resource interval in a case that a HARQ-D2D transmission collision avoidance scheme #4 is used in a communication system supporting a D2D scheme will be described with FIGS. 14A and 14B.

FIG. 14A illustrates a sub-frame pattern for a D2D discovery resource interval in a case that a HARQ-D2D transmission collision avoidance scheme #4 is used in a communication system supporting a D2D scheme according to an embodiment of the present disclosure.

Referring to FIG. 14A, if a retx_interval is set as described in FIG. 11A, a relation between a D2D discovery sub-frame and a non-D2D discovery sub-frame for a D2D discovery resource interval may be set as a sub-frame pattern in FIG. 14A. For example, in FIG. 14A, a region#1 includes N*(retx_interval+1) D2D discovery sub-frames, and a region#2 includes M*(retx_interval+1) non-D2D discovery sub-frames.

Referring to FIG. 14A, a parameter N and a parameter M may be signaled from a network, e.g., a BS to a UE. Alternately, a value of each of the parameter N and the parameter M may be a fixed value in the communication system.

Referring to FIG. 14A, location of each of the region#1 and the region#2 may be changed.

An example of a sub-frame pattern for a D2D discovery resource interval in a case that a HARQ-D2D transmission collision avoidance scheme #4 is used in a communication system supporting a D2D scheme has been described with reference to FIG. 14A, and another example of a sub-frame pattern for a D2D discovery resource interval in a case that a HARQ-D2D transmission collision avoidance scheme #4 is used in a communication system supporting a D2D scheme will be described with reference to FIG. 14B.

FIG. 14B illustrates a sub-frame pattern for a D2D discovery resource interval in a case that a HARQ-D2D transmission collision avoidance scheme #4 is used in a communication system supporting a D2D scheme according to an embodiment of the present disclosure.

Referring to FIG. 14B, if a retx_interval is set as described in FIG. 11B, a relation between a D2D discovery sub-frame and a non-D2D discovery sub-frame for a D2D discovery resource interval may be set as a sub-frame pattern in FIG. 14B. For example, referring to FIG. 14B, a region#1 includes N*retx_interval D2D discovery sub-frames, and a region#2 includes M*retx_interval non-D2D discovery sub-frames.

Referring to FIG. 14B, a parameter N and a parameter M may be signaled from a network, e.g., a BS to a UE. Alternately, a value of each of the parameter N and the parameter M may be a fixed value in the communication system.

Referring to FIG. 14B, location of each of the region#1 and the region#2 may be changed.

Another example of a sub-frame pattern for a D2D discovery resource interval in a case that a HARQ-D2D transmission collision avoidance scheme #4 is used in a communication system supporting a D2D scheme has been described with reference to FIG. 14B, and a process of using a sub-frame pattern during a D2D discovery resource interval in a case that a HARQ-D2D transmission collision avoidance scheme #4 is used in a communication system supporting a D2D scheme will be described with reference to FIGS. 15A to 15C.

Figure 15A:
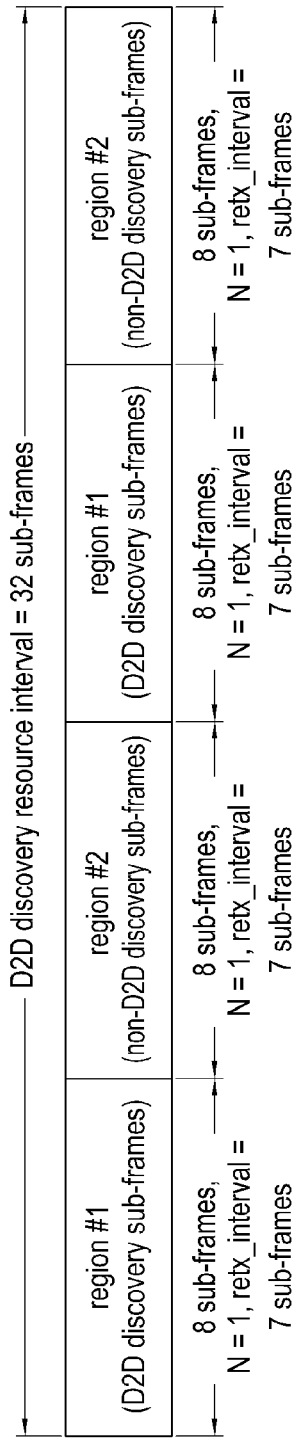
FIG. 15A illustrates a process of using a sub-frame pattern during a D2D discovery resource interval in a case that a HARQ-D2D transmission collision avoidance scheme #4 is used in a communication system supporting a D2D scheme according to an embodiment of the present disclosure.

FIG. 15A illustrates a process of using a sub-frame pattern during a D2D discovery resource interval in a case that a HARQ-D2D transmission collision avoidance scheme #4 is used in a communication system supporting a D2D scheme according to an embodiment of the present disclosure.

Referring to FIG. 15A, it will be noted that a process of using a sub-frame pattern is a process of using a sub-frame pattern in a case that a sub-frame pattern in FIG. 14A is used.

A process of using a sub-frame pattern in a case that a retx_interval includes 7 sub-frames, N is 1 (N=1), and M is 1 (M=1) is described in FIG. 15A. As described in FIG. 15A, the sub-frame pattern may be present partially based on a length of a D2D discovery resource interval. If the parameter M, the parameter N, and the retx_interval are signal to a UE (or may be fixed in the communication system, or may be signaled from a network, e.g., a BS), the UE may detect which sub-frame is a D2D discovery sub-frame and which sub-frame is a non-D2D discovery sub-frame during a D2D discovery resource interval.

For example, referring to FIG. 15A, a region#1 includes 1*(7+1) D2D discovery sub-frames, and a region#2 includes non-D2D discovery sub-frames. A D2D discovery resource interval includes 32 sub-frames. Referring to FIG. 15A, location of each of the region#1 and the region#2 may be changed.

An example of a process of using a sub-frame pattern during a D2D discovery resource interval in a case that a HARQ-D2D transmission collision avoidance scheme #4 is used in a communication system supporting a D2D scheme has been described with reference to FIG. 15A, and another example of a process of using a sub-frame pattern during a D2D discovery resource interval in a case that a HARQ-D2D transmission collision avoidance scheme #4 is used in a communication system supporting a D2D scheme will be described with reference to FIG. 15B.

Figure 15B:
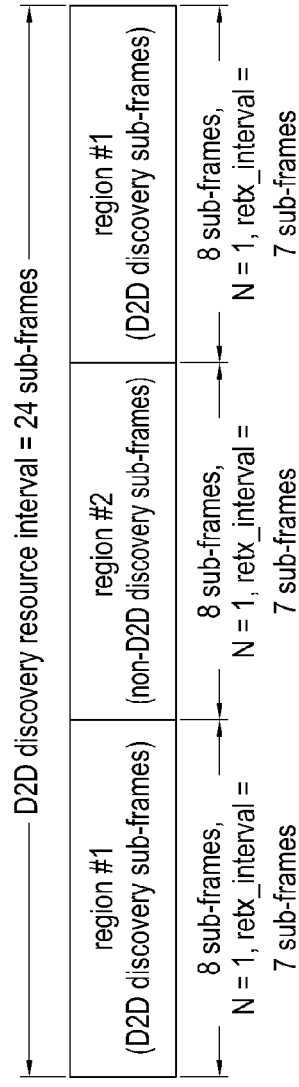
FIG. 15B illustrates a process of using a sub-frame pattern during a D2D discovery resource interval in a case that a HARQ-D2D transmission collision avoidance scheme #4 is used in a communication system supporting a D2D scheme according to an embodiment of the present disclosure.

FIG. 15B illustrates a process of using a sub-frame pattern during a D2D discovery resource interval in a case that a HARQ-D2D transmission collision avoidance scheme #4 is used in a communication system supporting a D2D scheme according to an embodiment of the present disclosure.

Referring to FIG. 15B, it will be noted that a process of using a sub-frame pattern is a process of using a sub-frame pattern in a case that a sub-frame pattern in FIG. 14A is used.

A process of using a sub-frame pattern in a case that a retx_interval includes 7 sub-frames, N is 1 (N=1), and M is 1 (M=1) is described in FIG. 15B. As described in FIG. 15B, the sub-frame pattern may be present partially based on a length of a D2D discovery resource interval. If the parameter M, the parameter N, and the retx_interval are signal to a UE (or may be fixed in the communication system, or may be signaled from a network, e.g., a BS), the UE may detect which sub-frame is a D2D discovery sub-frame and which sub-frame is a non-D2D discovery sub-frame during a D2D discovery resource interval.

For example, referring to FIG. 15B, a region#1 includes 1*(7+1) D2D discovery sub-frames, and a region#2 includes non-D2D discovery sub-frames. A D2D discovery resource interval includes 24 sub-frames. Referring to FIG. 15B, location of each of the region#1 and the region#2 may be changed.

Another example of a process of using a sub-frame pattern during a D2D discovery resource interval in a case that a HARQ-D2D transmission collision avoidance scheme #4 is used in a communication system supporting a D2D scheme has been described with reference to FIG. 15B, and still another example of a process of using a sub-frame pattern during a D2D discovery resource interval in a case that a HARQ-D2D transmission collision avoidance scheme #4 is used in a communication system supporting a D2D scheme will be described with reference to FIG. 15C.

FIG. 15C illustrates a process of using a sub-frame pattern during a D2D discovery resource interval in a case that a HARQ-D2D transmission collision avoidance scheme #4 is used in a communication system supporting a D2D scheme according to an embodiment of the present disclosure.

Referring to FIG. 15C, it will be noted that a process of using a sub-frame pattern is a process of using a sub-frame pattern in a case that a sub-frame pattern in FIG. 14A is used.

A process of using a sub-frame pattern in a case that a retx_interval includes 7 sub-frames, N is 1 (N=1), and M is 1 (M=1) is described in FIG. 15C. As described in FIG. 15C, the sub-frame pattern may be present partially based on a length of a D2D discovery resource interval. If the parameter M, the parameter N, and the retx_interval are signal to a UE (or may be fixed in the communication system, or may be signaled from a network, e.g., a BS), the UE may detect which sub-frame is a D2D discovery sub-frame and which sub-frame is a non-D2D discovery sub-frame during a D2D discovery resource interval.

For example, referring to FIG. 15C, a region#1 includes 1*(7+1) D2D discovery sub-frames, and a region#2 includes 1*(7+1) non-D2D discovery sub-frames. A D2D discovery resource interval 30 sub-frames. Referring to FIG. 15C, one region#2 included in the D2D discovery resource interval includes 6 sub-frames.

Referring to FIG. 15C, location of each of the region#1 and the region#2 may be changed.

A process of using a sub-frame pattern during a D2D discovery resource interval in a case that a HARQ-D2D transmission collision avoidance scheme #4 is used in a communication system supporting a D2D scheme has been described with reference to FIGS. 15A to 15C, and another example of a sub-frame pattern for a D2D discovery resource interval in a case that a HARQ-D2D transmission collision avoidance scheme #4 is used in a communication system supporting a D2D scheme will be described with reference to FIG. 16.

FIG. 16 illustrates a sub-frame pattern for a D2D discovery resource interval in a case that a HARQ-D2D transmission collision avoidance scheme #4 is used in a communication system supporting a D2D scheme according to an embodiment of the present disclosure.

Referring to FIG. 16, a sub-frame pattern in FIG. 14A may be changed to a sub-frame pattern.

Firstly, in a region#1, some sub-frames among sub-frames included in the region#1 may be used as non-D2D discovery sub-frames for preventing skipping any transmission for latency sensitive applications, such as a voice over Internet protocol (VoIP), and the like. If a sub-frame x is used as a non-D2D discovery sub-frame, a sub-frame x+retx_interval+1 and a sub-frame x−retx_interval−1 will be used as non-D2D discovery sub-frames.

The non-D2D discovery sub-frames included in the region#1 may be indicated based on a bitmap. A size of the bitmap is retx_interval+1. A non-D2D discovery sub-frame is repeated every retx_interval+1 in the region#1 (if N is greater than 1 (N>1)). Referring to FIG. 16, for example, the bitmap may be expressed as 11000000. For example, in the bitmap, each of bits of which the number is identical to the number of sub-frames included in a related region, i.e., retx_interval+1 bits are mapped to the sub-frames included in the related region one to one. For example, a value of the retx_interval+1 bits is set to 1 if a related sub-frame is used as a non-D2D discovery sub-frame, and is set to 0 if the related sub-frame is not used as the non-D2D discovery sub-frame.

Non-D2D discovery sub-frames included in a related region may be indicated as the number of the non-D2D discovery sub-frames included in the related region instead of the bitmap. If the non-D2D discovery sub-frames included in the related region is indicated as the number of the non-D2D discovery sub-frames included in the related region, the non-D2D discovery sub-frames are started from specific location, e.g., the first sub-frame of the related region, the last sub-frame of the related region, or a fixed sub-frame of the related region.

Another example of a sub-frame pattern for a D2D discovery resource interval in a case that a HARQ-D2D transmission collision avoidance scheme #4 is used in a communication system supporting a D2D scheme has been described with reference to FIG. 16, and still another example of a sub-frame pattern for a D2D discovery resource interval in a case that a HARQ-D2D transmission collision avoidance scheme #4 is used in a communication system supporting a D2D scheme will be described with reference to FIG. 17.

FIG. 17 illustrates a sub-frame pattern for a D2D discovery resource interval in a case that a HARQ-D2D transmission collision avoidance scheme #4 is used in a communication system supporting a D2D scheme according to an embodiment of the present disclosure.

Referring to FIG. 17, a sub-frame pattern in FIG. 14B may be changed to a sub-frame pattern.

Firstly, in a region#1, some sub-frames among sub-frames included in the region#1 may be used as non-D2D discovery sub-frames for preventing skipping any transmission for latency sensitive applications, such as a VoIP, and the like. If a sub-frame x is used as a non-D2D discovery sub-frame, a sub-frame x+retx_interval and a sub-frame x−retx_interval will be used as non-D2D discovery sub-frames.

The non-D2D discovery sub-frames included in the region#1 may be indicated based on a bitmap. A size of the bitmap is retx_interval. A non-D2D discovery sub-frame is repeated every retx_interval in the region#1 (if N is greater than 1 (N>1)). Referring to FIG. 17, for example, the bitmap may be expressed as 11000000. For example, in the bitmap, each of bits of which the number is identical to the number of sub-frames included in a related region, i.e., retx_interval bits are mapped to the sub-frames included in the related region one to one. For example, a value of the retx_interval bits is set to 1 if a related sub-frame is used as a non-D2D discovery sub-frame, and is set to 0 if the related sub-frame is not used as the non-D2D discovery sub-frame.

Non-D2D discovery sub-frames included in a related region may be indicated as the number of the non-D2D discovery sub-frames included in the related region instead of the bitmap. If the non-D2D discovery sub-frames included in the related region is indicated as the number of the non-D2D discovery sub-frames included in the related region, the non-D2D discovery sub-frames are started from specific location, e.g., the first sub-frame of the related region, the last sub-frame of the related region, or a fixed sub-frame of the related region.

A HARQ-D2D transmission collision avoidance scheme #4 in a communication system supporting a D2D scheme has been described with reference to FIGS. 10 to 17, and a HARQ-D2D transmission collision avoidance scheme #5 in a communication system supporting a D2D scheme will be described with reference to FIG. 18.

FIG. 18 illustrates a HARQ-D2D transmission collision avoidance scheme #5 in a communication system supporting a D2D scheme according to an embodiment of the present disclosure.

Referring to FIG. 18, if a sub-frame x is a D2D discovery sub-frame, a BS determines whether a UL HARQ packet which is scheduled in a sub-frame x−retx_interval−1 (if a retx_interval is set as described in FIG. 11A) or a sub-frame x−retx_interval (if a retx_interval is set as described in FIG. 11B) is successfully received. If the UL HARQ packet which is scheduled in the sub-frame is not received successfully, and maximum transmissions for the UL HARQ packet are not completed, the BS updates D2D discovery resource configuration, and broadcasts the updated D2D discovery resource configuration.

Meanwhile, while changing configuration on a D2D discovery resource, i.e., D2D discovery resource configuration, a BS indicates that a sub-frame x is not a D2D discovery sub-frame, or that specific resource blocks (RBs) included in a sub-frame x which corresponds to a UL HARQ packet which is not received successfully are not D2D discovery RBs. Information on the D2D discovery resource configuration may be signaled by transmitting updated system information or a PDCCH signal including downlink control information (DCI). For example, the information on the changed D2D discovery resource configuration may be transmitted through system information or a PDCCH signal. For example, the PDCCH signal is masked with a D2D cell radio network temporary identifier (C-RNTI). The PDCCH signal including the information on the changed D2D discovery resource configuration may be transmitted in the D2D discovery sub-frame, i.e., a D2D sub-frame which is at a set offset from the D2D discovery sub-frame x.

A HARQ-D2D transmission collision avoidance scheme #5 in a communication system supporting a D2D scheme has been described with reference to FIG. 18, and a HARQ-D2D transmission collision avoidance scheme #6 in a communication system supporting a D2D scheme will be described with reference to FIGS. 19 to 22.

An example of an operating process of a BS in a HARQ-D2D transmission collision avoidance scheme #6 in a communication system supporting a D2D scheme will be described with reference to FIG. 19.

Figure 19:
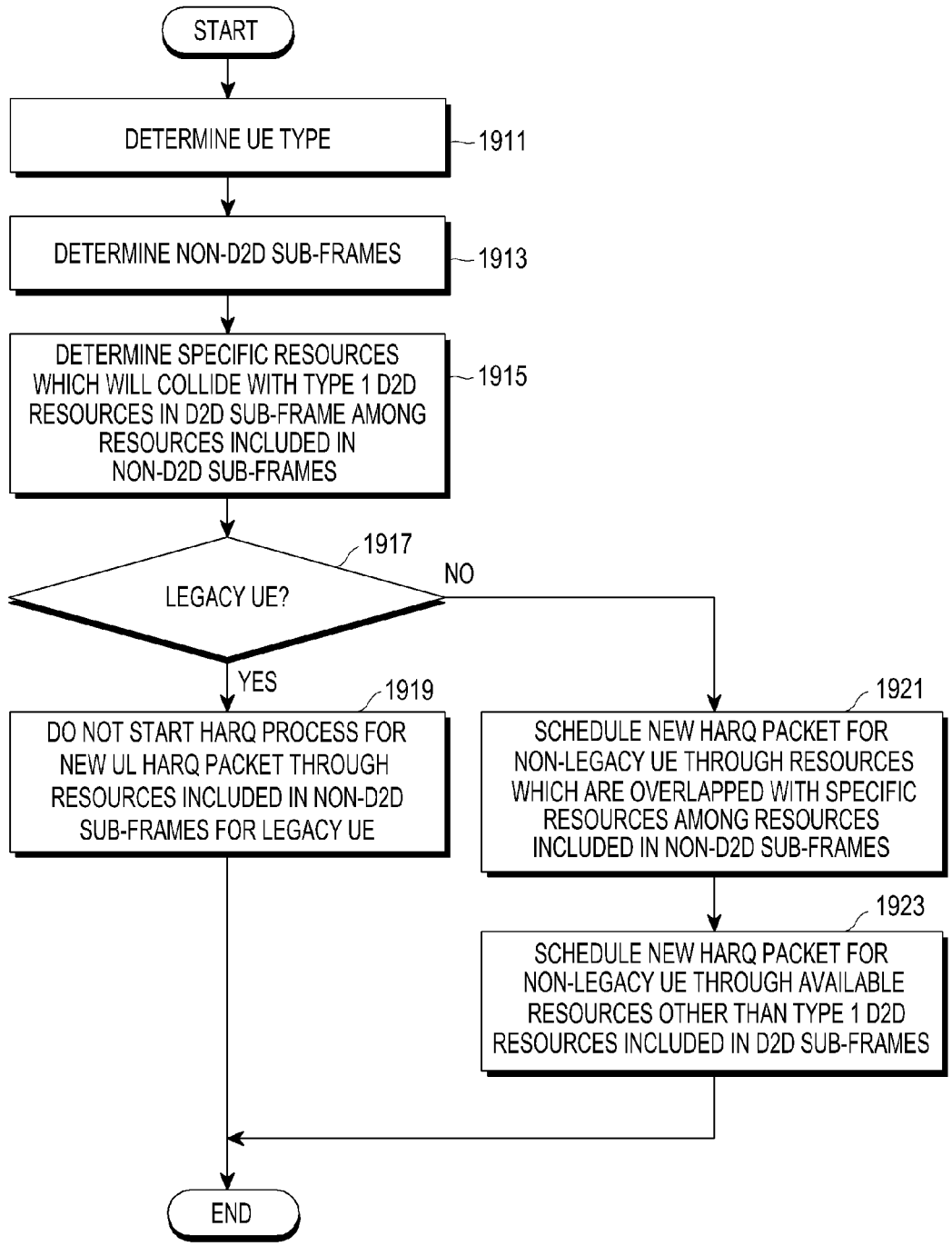
FIG. 19 is a flowchart illustrating an operating process of a BS in a HARQ-D2D transmission collision avoidance scheme #6 in a communication system supporting a D2D scheme according to an embodiment of the present disclosure.

FIG. 19 is a flowchart illustrating an operating process of a BS in a HARQ-D2D transmission collision avoidance scheme #6 in a communication system supporting a D2D scheme according to an embodiment of the present disclosure.

Referring to FIG. 19, it will be noted that an operating process of a BS in FIG. 19 is an operating process of a BS which supports a D2D scheme, and allocates resources for the D2D scheme. A type of each of the resources for the D2D scheme is one of a type 1 and a type 2, a type 1 D2D resource denotes a contention-based D2D resource, and a type 2 D2D resource denotes a dedicated D2D resource.

The BS determines a UE type of a UE at operation 1911. For example, the BS determines whether the UE is a legacy UE based on the determined UE type. Here, the BS determines the UE type of the UE based on UE capability information. The BS may determine UE capability of the UE based on a UE subscription profile, or capability information which is signaled to the BS from the UE.

The BS determines non-D2D sub-frames at operation 1913 such that HARQ packets for a HARQ process which is started or scheduled in the non-D2D sub-frame may collide with D2D transmissions which are performed within a D2D sub-frame including type 1 resources. The BS determines the non-D2D sub-frames based on location of a D2D sub-frame, a retx_interval, and a maximum transmission number for UL HARQ. The BS determines specific resources among resources included in the determined non-D2D sub-frames which will collide with type 1 D2D resources in a D2D sub-frame at operation 1915. The BS determines whether the UE is a legacy UE based on the determined UE type at operation 1917. Alternately, the determination of the UE type at operation 1911 may also be performed after operation 1915.

If it is determined in operation 1917 that the UE is the legacy UE, the BS does not start a HARQ process for any new UL HARQ packet in the determined resources included in the determined non-D2D sub-frames for the legacy UE at operation 1919. For example, the BS schedules a new HARQ packet for the legacy UE through resources other than type 1 D2D resources included in D2D sub-frames and the determined resources among the resources included in the determined non-D2D sub-frame, or on other carrier. The legacy UE denotes a UE which does not know allocated D2D resources, and has no capability of detecting the allocated D2D resources. For example, if a D2D scheme is included in a wireless communication standard release x, and a UE is compliant to a release y (y<x), the UE which is compliant to the release y is the legacy UE. In an embodiment of the present disclosure, the legacy UE may be a UE which does not support the D2D scheme.

If it is determined in operation 1917 that the UE is not the legacy UE, that is, the UE is a non-legacy UE, the BS schedules a new HARQ packet for the non-legacy UE through resources which are overlapped with the determined specific resources among resources included in the determined non-D2D sub-frame at operation 1921. If the determined specific resources among the resources included in the determined non-D2D sub-frame are already used, the BS schedules a new HARQ packet for the non-legacy UE through available resources other than the type 1 D2D resources included in D2D sub-frames at operation 1923.

Although FIG. 19 illustrates an example of an operating process of a BS in a HARQ-D2D transmission collision avoidance scheme #6 in a communication system supporting a D2D scheme, various changes could be made to FIG. 19. For example, although shown as a series of operations, various operations in FIG. 19 could overlap, occur in parallel, occur in a different order, or occur multiple times.

An example of an operating process of a BS in a HARQ-D2D transmission collision avoidance scheme #6 in a communication system supporting a D2D scheme has been described with reference to FIG. 19, and another example of an operating process of a BS in a HARQ-D2D transmission collision avoidance scheme #6 in a communication system supporting a D2D scheme will be described with reference to FIG. 20.

Figure 20:
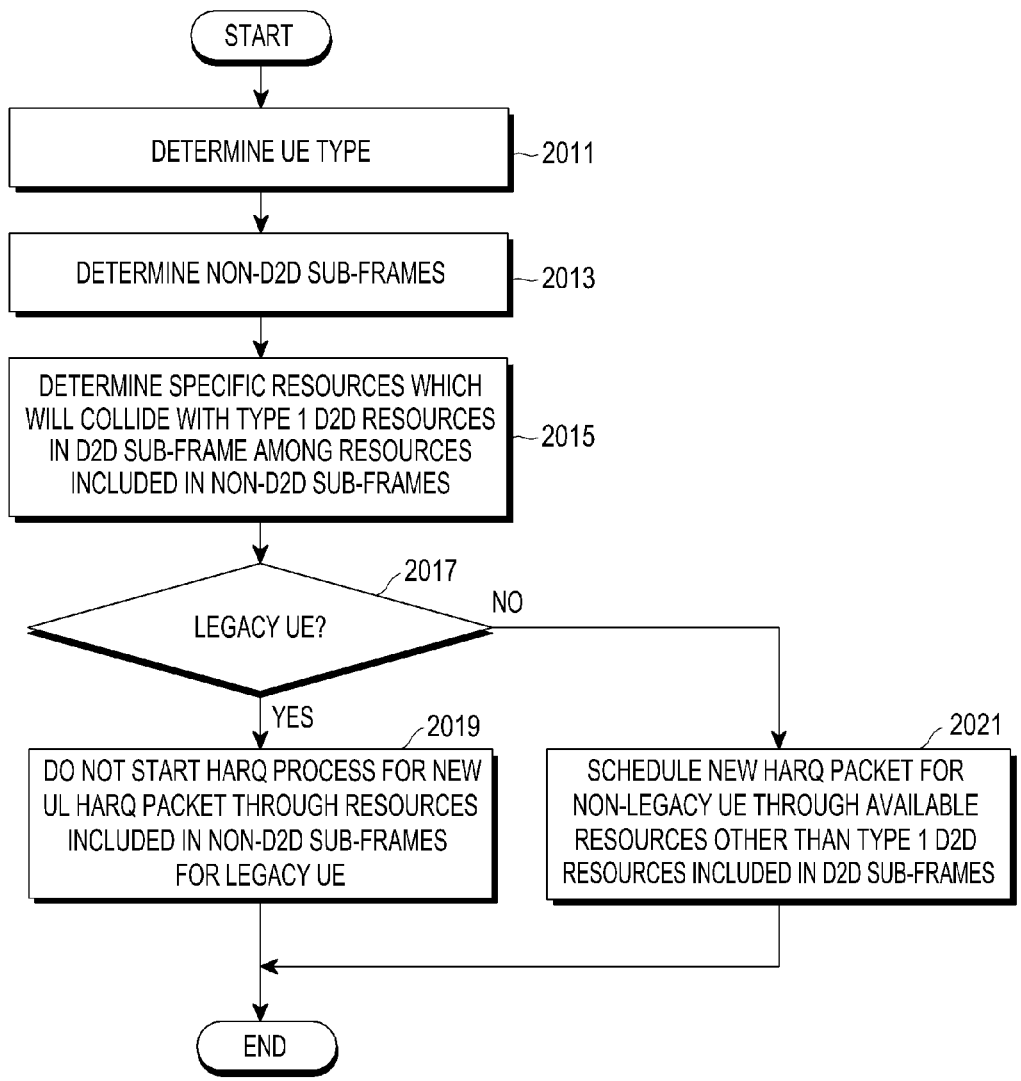
FIG. 20 is a flowchart illustrating an operating process of a BS in a HARQ-D2D transmission collision avoidance scheme #6 in a communication system supporting a D2D scheme according to an embodiment of the present disclosure.

FIG. 20 is a flowchart illustrating an operating process of a BS in a HARQ-D2D transmission collision avoidance scheme #6 in a communication system supporting a D2D scheme according to an embodiment of the present disclosure.

Referring to FIG. 20, it will be noted that an operating process of a BS is an operating process of a BS which supports a D2D scheme, and allocates resources for the D2D scheme. A type of each of the resources for the D2D scheme is one of a type 1 and a type 2, a type 1 D2D resource denotes a contention-based D2D resource, and a type 2 D2D resource denotes a dedicated D2D resource.

The BS determines a UE type of a UE at operation 2011. For example, the BS determines whether the UE is a legacy UE based on the determined UE type. Here, the BS determines the UE type of the UE based on UE capability information. The BS may determine UE capability of the UE based on a UE subscription profile, or capability information which is signaled to the BS from the UE.

The BS determines non-D2D sub-frames at operation 2013 such that HARQ packets for a HARQ process which is started at one of the non-D2D sub-frames may collide with D2D transmissions which are performed within a D2D sub-frame including type 1 resources. The BS determines the non-D2D sub-frames based on location of a D2D sub-frame, a retx_interval, and a maximum transmission number for UL HARQ. The BS determines specific resources among resources included in the determined non-D2D sub-frames which will collide with type 1 D2D resources in a D2D sub-frame at operation 2015. The BS determines whether the UE is a legacy UE based on the determined UE type at operation 2017. Alternately, the determination of the UE type at operation 2011 may also be performed after operation 2015. If it is determined in operation 2017 that the UE is the legacy UE, the BS does not start a HARQ process for any new UL HARQ packet using the determined resources included in the determined non-D2D sub-frames for the legacy UE at operation 2019. For example, the BS schedules a new HARQ packet for the legacy UE using resources other than type 1 D2D resources included in D2D sub-frames and the determined specific resources among the resources included in the determined non-D2D sub-frame, or on other carrier. The legacy UE denotes a UE which does not know allocated D2D resources, and has no capability of detecting the allocated D2D resources. For example, if a D2D scheme is included in a wireless communication standard release x, and a UE is compliant to a release y (y<x), the UE which is compliant to the release y is the legacy UE. In an embodiment of the present disclosure, the legacy UE may be a UE which does not support the D2D scheme.

If it is determined in operation 2017 that the UE is not the legacy UE, that is, the UE is a non-legacy UE, the BS schedules for the non-legacy UE through available resources other than the type 1 D2D resources included in the D2D sub-frames at operation 2021.

Although FIG. 20 illustrates another example of an operating process of a BS in a HARQ-D2D transmission collision avoidance scheme #6 in a communication system supporting a D2D scheme, various changes could be made to FIG. 20. For example, although shown as a series of operations, various operations in FIG. 20 could overlap, occur in parallel, occur in a different order, or occur multiple times.

Another example of an operating process of a BS in a HARQ-D2D transmission collision avoidance scheme #6 in a communication system supporting a D2D scheme has been described with reference to FIG. 20, and still another example of an operating process of a BS in a HARQ-D2D transmission collision avoidance scheme #6 in a communication system supporting a D2D will be described with reference to FIG. 21.

Figure 21:
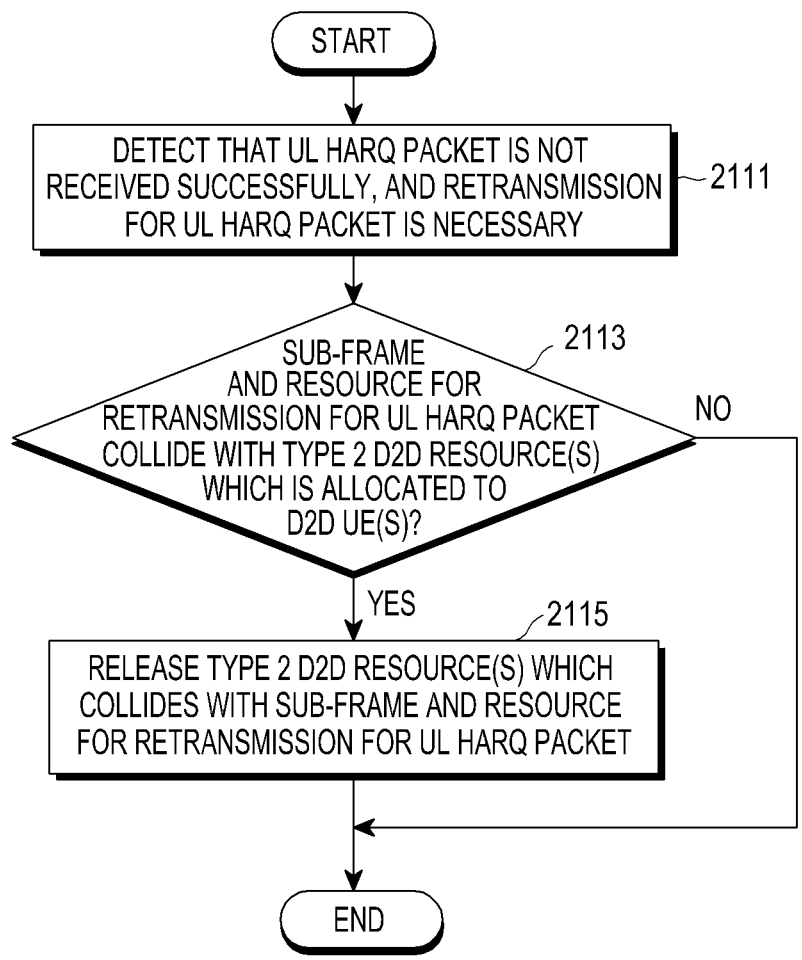
FIG. 21 is a flowchart illustrating an operating process of a BS in a HARQ-D2D transmission collision avoidance scheme #6 in a communication system supporting a D2D scheme according to an embodiment of the present disclosure.

FIG. 21 is a flowchart illustrating an operating process of a BS in a HARQ-D2D transmission collision avoidance scheme #6 in a communication system supporting a D2D scheme according to an embodiment of the present disclosure.

Referring to FIG. 21, it will be noted that an operating process of a BS is an operating process of a BS for a retransmission of a HARQ packet.

The BS detects that a UL HARQ packet is not received successfully by the BS, and there is a need for retransmitting the UL HARQ packet by a UE at operation 2111. The BS determines whether a sub-frame and a resource for a retransmission of the UL HARQ packet by the UE will collide with a type 2 D2D resource(s) which is allocated to other D2D UE(s) at operation 2113.

If it is determined in operation 2113 that the sub-frame and the resource for the retransmission of the UL HARQ packet by the UE collide with the type 2 D2D resource(s) which is allocated to the other D2D UE(s), the BS determines to release the type 2 D2D resource(s) which collides with the sub-frame and the resource for the retransmission of the UL HARQ packet, and signals information indicating that the type 2 D2D resource(s) which collides with the sub-frame and the resource for the retransmission of the UL HARQ packet are released to the D2D UE(s) to which the type 2 D2D resource(s) which collides with the sub-frame and the resource for the retransmission of the UL HARQ packet is allocated at operation 2115.

If it is determined in operation 2113 that the sub-frame and the resource for the retransmission of the UL HARQ packet do not collide with the type 2 D2D resource(s) which is allocated the D2D UE(s), the BS performs a normal operation, i.e., a legacy operation, and a detailed description will be omitted herein.

Meanwhile, in an embodiment of the present disclosure, a HARQ-D2D transmission collision avoidance scheme #6 may be applied by a BS to D2D discovery sub-frames which are configured within a cell which the BS manages.

The HARQ-D2D transmission collision avoidance scheme #6 may be applied by the BS to D2D communication sub-frames which are configured within the cell which the BS manages.

The HARQ-D2D transmission collision avoidance scheme #6 may be applied by the BS to all of the D2D discovery sub-frames and the D2D communication sub-frames which are configured within the cell which the BS manages.

The HARQ-D2D transmission collision avoidance scheme #6 may be applied by the BS to D2D discovery sub-frames which are configured within the cell which the BS manages and to D2D discovery sub-frames which are configured in the neighbor cells.

The HARQ-D2D transmission collision avoidance scheme #6 may be applied by the BS to D2D communication sub-frames which are configured within the cell which the BS manages and to D2D communication sub-frames which are configured in the neighbor cells.

The HARQ-D2D transmission collision avoidance scheme #6 may be applied by the BS to all of the D2D discovery sub-frames and the D2D communication sub-frames which are configured within the cell which the BS manages and to all of the D2D discovery sub-frames and the D2D communication sub-frames which are configured in the neighbor cells.

Although FIG. 21 illustrates still another example of an operating process of a BS in a HARQ-D2D transmission collision avoidance scheme #6 in a communication system supporting a D2D scheme, various changes could be made to FIG. 21. For example, although shown as a series of operations, various operations in FIG. 21 could overlap, occur in parallel, occur in a different order, or occur multiple times.

Still another example of an operating process of a BS in a HARQ-D2D transmission collision avoidance scheme #6 in a communication system supporting a D2D scheme has been described with reference to FIG. 21, and an operating process of a UE in a HARQ-D2D transmission collision avoidance scheme #6 in a communication system supporting a D2D scheme will be described with reference to FIG. 22.

Figure 22:
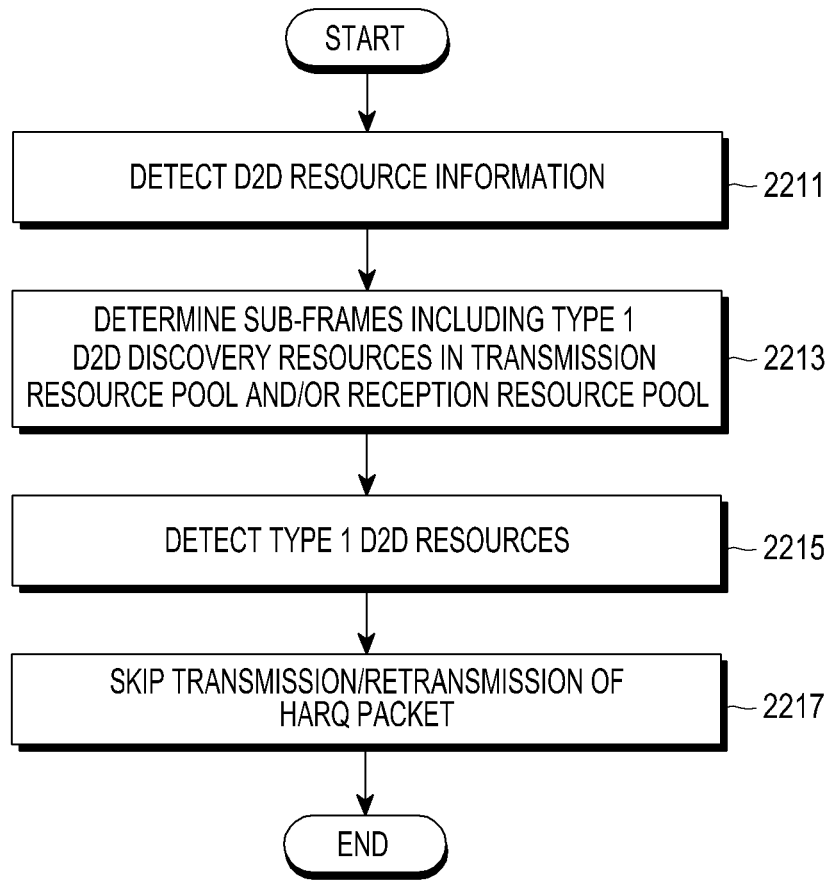
FIG. 22 is a flowchart illustrating an operating process of a UE in a HARQ-D2D transmission collision avoidance scheme #6 in a communication system supporting a D2D scheme according to an embodiment of the present disclosure.

FIG. 22 is a flowchart illustrating an operating process of a UE in a HARQ-D2D transmission collision avoidance scheme #6 in a communication system supporting a D2D scheme according to an embodiment of the present disclosure.

Prior to a description of FIG. 22, an operation of a legacy UE in a case that a HARQ-D2D transmission collision avoidance scheme #6 is applied is identical to an operation of a legacy UE in a case that the HARQ-D2D transmission collision avoidance scheme #6 is not applied, that is, the operation of the legacy UE in the case that the HARQ-D2D transmission collision avoidance scheme #6 is applied is identical to an operation of a general legacy UE, and a detailed description will be omitted herein.

Here, the non-legacy UE denotes a UE which supports a D2D scheme or may detect allocated/reserved resources for a D2D scheme.

Referring to FIG. 22, a UE, i.e., a non-legacy UE receives a signal which a BS transmits, and detects D2D resource information by decoding the received signal at operation 2211. Here, an operation of detecting the D2D resource information in the non-legacy UE will be described below.

The BS transmits system information including D2D discovery resource information, and the non-legacy UE receives the system information from the BS, and detects the D2D discovery resource information based on the received system information. In an embodiment of the present disclosure, system information related to a D2D scheme, i.e., D2D system information may be detected even though the D2D scheme is not supported by the non-legacy UE. The system information, i.e., the D2D system information includes information related to a type 1 transmission resource pool and/or a type 1 reception resource pool including type 1 D2D resources and type 2 D2D resources. The D2D system information includes information related to which resources are used as type 1 D2D resources and/or type 2 D2D resources.

The non-legacy UE determines sub-frames including type 1 D2D discovery resources among a transmission resource pool and/or a reception resource pool at operation 2213. The non-legacy UE detects type 1 D2D resources included in the determined sub-frames based on the D2D system information at operation 2215. The non-legacy UE skips a transmission/retransmission of a HARQ packet upon detecting that resources for the HARQ packet collide with D2D resources included in the determined D2D sub-frames at operation 2217.

Although FIG. 22 illustrates an operating process of a UE in a HARQ-D2D transmission collision avoidance scheme #6 in a communication system supporting a D2D scheme, various changes could be made to FIG. 22. For example, although shown as a series of operations, various operations in FIG. 22 could overlap, occur in parallel, occur in a different order, or occur multiple times.

Meanwhile, in an embodiment of the present disclosure, a HARQ-D2D transmission collision avoidance scheme #6 may be applied by a UE to D2D discovery sub-frames within a serving cell of the UE.

The HARQ-D2D transmission collision avoidance scheme #6 may be applied by the UE to D2D communication sub-frames within the serving cell of the UE.

The HARQ-D2D transmission collision avoidance scheme #6 may be applied by the UE to all of the D2D discovery sub-frames and the D2D communication sub-frames within the serving cell of the UE.

The HARQ-D2D transmission collision avoidance scheme #6 may be applied by the UE to D2D discovery sub-frames within the serving cell of the UE and to D2D discovery sub-frames in the neighbor cells.

The HARQ-D2D transmission collision avoidance scheme #6 may be applied by the UE to only D2D communication sub-frames within the serving cell of the UE and to D2D communication sub-frames in the neighbor cells.

The HARQ-D2D transmission collision avoidance scheme #6 may be applied by the UE to all of the D2D discovery sub-frames and the D2D communication sub-frames within the serving cell of the UE and to all of the D2D discovery sub-frames and the D2D communication sub-frames in the neighbor cells.

A HARQ-D2D transmission collision avoidance scheme #6 in a communication system supporting a D2D scheme has been described with reference to FIGS. 19 to 22, and a HARQ-D2D transmission collision avoidance scheme #7 in a communication system supporting a D2D scheme will be described with reference to FIGS. 23 to 26.

An example of an operating process of a BS in a HARQ-D2D transmission collision avoidance scheme #7 in a communication system supporting a D2D scheme will be described with reference to FIG. 23.

Figure 23:
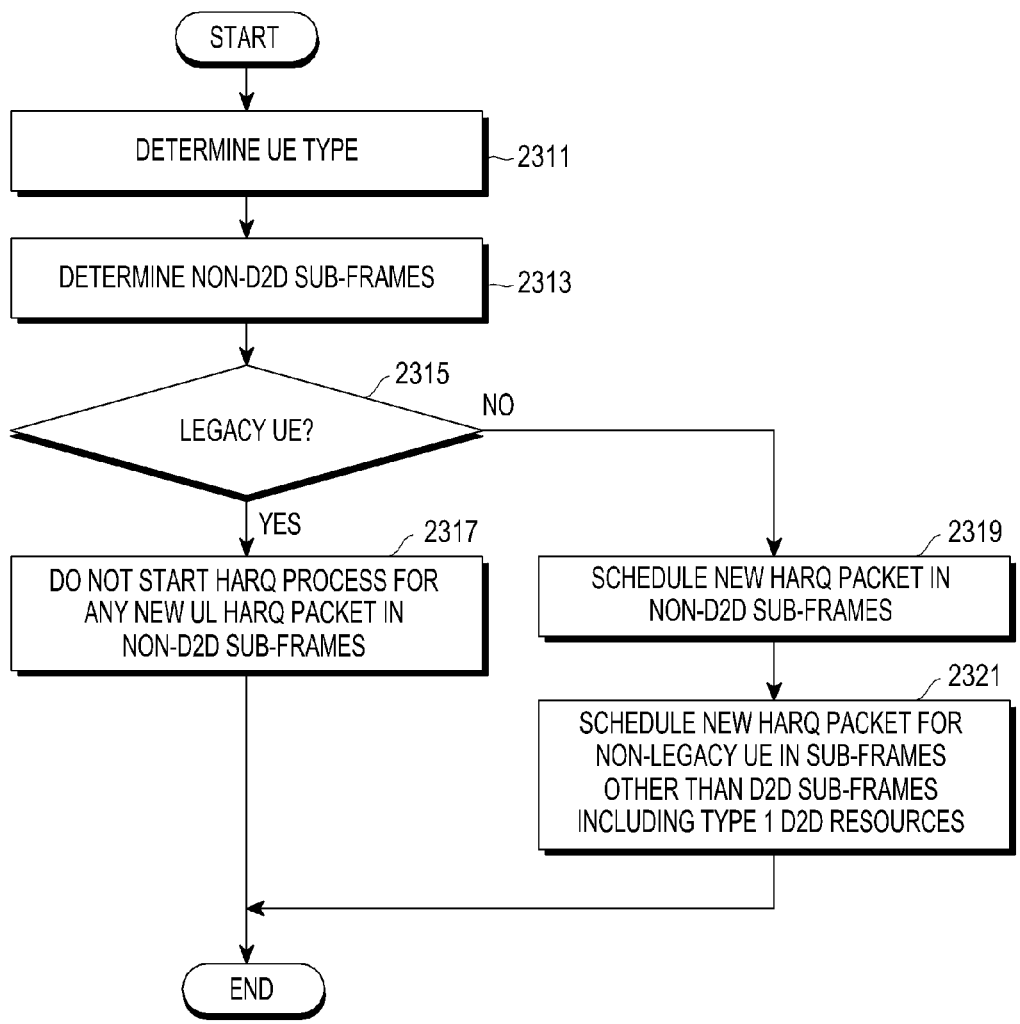
FIG. 23 is a flowchart illustrating an operating process of a BS in a HARQ-D2D transmission collision avoidance scheme #7 in a communication system supporting a D2D scheme according to an embodiment of the present disclosure.

FIG. 23 is a flowchart illustrating an operating process of a BS in a HARQ-D2D transmission collision avoidance scheme #7 in a communication system supporting a D2D scheme according to an embodiment of the present disclosure.

Referring to FIG. 23, it will be noted that an operating process of a BS is an operating process of a BS which supports a D2D scheme, and allocates resources for the D2D scheme. A type of each of the resources for the D2D scheme is one of a type 1 and a type 2, a type 1 D2D resource denotes a contention-based D2D resource, and a type 2 D2D resource denotes a dedicated D2D resource.

The BS determines a UE type of a UE at operation 2311. The BS determines whether the UE is a legacy UE based on the determined UE type. The BS determines the UE type of the UE based on UE capability information. The BS may determine UE capability of the UE based on a UE subscription profile, or capability information which is signaled to the BS from the UE.

The BS determines non-D2D sub-frames at operation 2313 such that HARQ packets for a HARQ process which is started at one of the non-D2D sub-frames may collide with D2D transmissions which are performed within a D2D sub-frame including type 1 resources. The BS determines the non-D2D sub-frames based on location of a D2D sub-frame, a retx_interval, and a maximum transmission number for UL HARQ. The BS determines whether the UE is a legacy UE based on the determined UE type at operation 2315.

If it is determined in operation 2315 that the UE is the legacy UE, the BS does not start a HARQ process for any new UL HARQ packet in the determined non-D2D sub-frames for the legacy UE at operation 2317. For example, the BS schedules a new HARQ packet for the legacy UE in sub-frames other than the determined non-D2D sub-frame including type 1 D2D resources, and a non-D2D sub-frame, or on other carrier. The legacy UE denotes a UE which does not know allocated D2D resources, and has no capability of detecting the allocated D2D resources. For example, if a D2D scheme is included in a wireless communication standard release x, and a UE is compliant to a release y (y<x), the UE which is compliant to the release y is the legacy UE. In an embodiment of the present disclosure, the legacy UE may be a UE which does not support the D2D scheme.

If it is determined in operation 2315 that the UE is not the legacy UE, that is, the UE is a non-legacy UE, the BS schedules a new HARQ packet in the determined non-D2D sub-frame at operation 2319. If the determined non-D2D sub-frames are already used, the BS schedules a new HARQ packet for the non-legacy UE in sub-frames other than D2D sub-frames including type 1 D2D resources at operation 2321.

Although FIG. 23 illustrates an example of an operating process of a BS in a HARQ-D2D transmission collision avoidance scheme #7 in a communication system supporting a D2D scheme, various changes could be made to FIG. 23. For example, although shown as a series of operations, various operations in FIG. 23 could overlap, occur in parallel, occur in a different order, or occur multiple times.

An example of an operating process of a BS in a HARQ-D2D transmission collision avoidance scheme #7 in a communication system supporting a D2D scheme has been described with reference to FIG. 23, and another example of an operating process of a BS in a HARQ-D2D transmission collision avoidance scheme #7 in a communication system supporting a D2D will be described with reference to FIG. 24.

Figure 24:
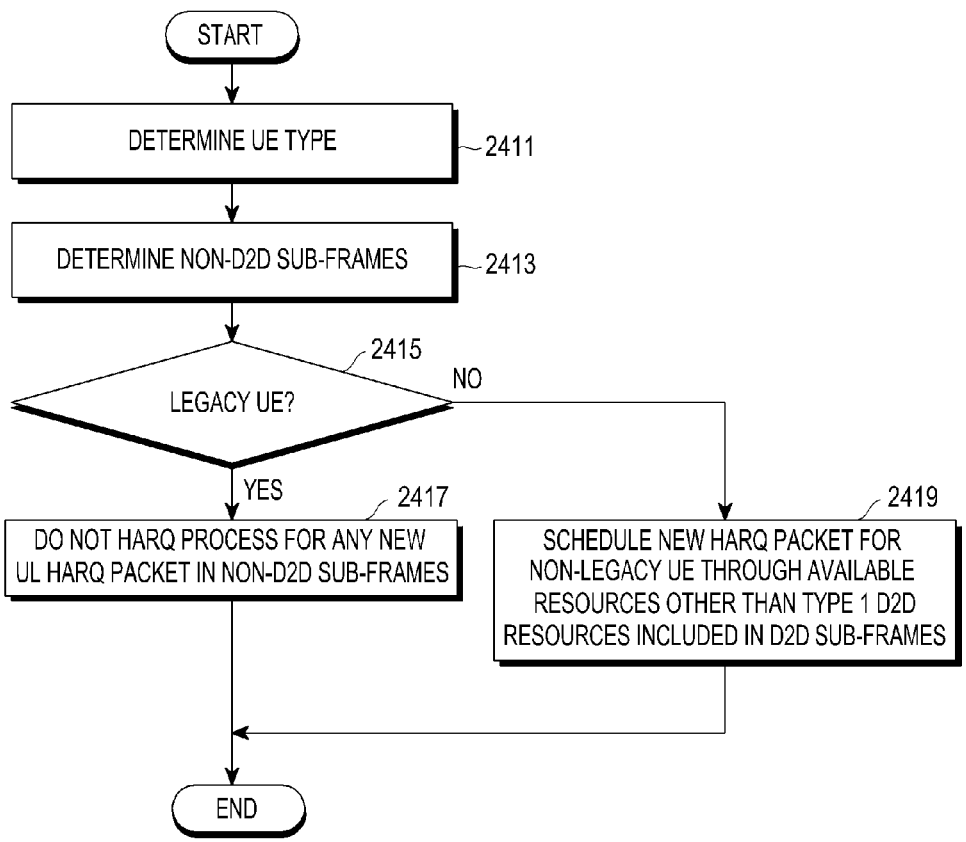
FIG. 24 is a flowchart illustrating an operating process of a BS in a HARQ-D2D transmission collision avoidance scheme #7 in a communication system supporting a D2D scheme according to an embodiment of the present disclosure.

FIG. 24 is a flowchart illustrating an operating process of a BS in a HARQ-D2D transmission collision avoidance scheme #7 in a communication system supporting a D2D scheme according to an embodiment of the present disclosure.

Referring to FIG. 24, it will be noted that an operating process of a BS is an operating process of a BS which supports a D2D scheme, and allocates resources for the D2D scheme. A type of each of the resources for the D2D scheme is one of a type 1 and a type 2, a type 1 D2D resource denotes a contention-based D2D resource, and a type 2 D2D resource denotes a dedicated D2D resource.

The BS determines a UE type of a UE at operation 2411. For example, the BS determines whether the UE is a legacy UE based on the determined UE type. The BS determines the UE type of the UE based on UE capability information. The BS may determine UE capability of the UE based on a UE subscription profile, or capability information which is signaled to the BS from the UE.

The BS determines non-D2D sub-frames at operation 2413 such that, HARQ packets for a HARQ process which is started at one of the non-D2D sub-frames may collide with D2D transmissions which are performed within a D2D sub-frame including type 1 resources. The BS determines the non-D2D sub-frames based on location of a D2D sub-frame, a retx_interval, and a maximum transmission number for UL HARQ. The BS determines whether the UE is a legacy UE based on the determined UE type at operation 2415.

If it is determined in operation 2415 that the UE is the legacy UE, the BS does not start a HARQ process for any new UL HARQ packet in the determined non-D2D sub-frames for the legacy UE at operation 2417. For example, the BS schedules a new HARQ packet for the legacy UE in sub-frames other than the determined non-D2D sub-frame including type 1 D2D resources and a non-D2D sub-frame, or on other carrier. The legacy UE denotes a UE which does not know allocated D2D resources, and has no capability of detecting the allocated D2D resources. For example, if a D2D scheme is included in a wireless communication standard release x, and a UE is compliant to a release y (y<x), the UE which is compliant to the release y is the legacy UE. In an embodiment of the present disclosure, the legacy UE may be a UE which does not support the D2D scheme.

If it is determined in operation 2415 that the UE is not the legacy UE, that is, the UE is a non-legacy UE, the BS schedules a new HARQ packet for the non-legacy UE through available resources other than type 1 D2D resources included in D2D sub-frames at operation 2419.

Although FIG. 24 illustrates another example of an operating process of a BS in a HARQ-D2D transmission collision avoidance scheme #7 in a communication system supporting a D2D scheme, various changes could be made to FIG. 24. For example, although shown as a series of operations, various operations in FIG. 24 could overlap, occur in parallel, occur in a different order, or occur multiple times.

Another example of an operating process of a BS for HARQ packet scheduling in a HARQ-D2D transmission collision avoidance scheme #7 in a communication system supporting a D2D scheme has been described with reference to FIG. 24, and still another example of an operating process of a BS for HARQ packet retransmission in a HARQ-D2D transmission collision avoidance scheme #7 in a communication system supporting a D2D scheme will be described with reference to FIG. 25.

Figure 25:
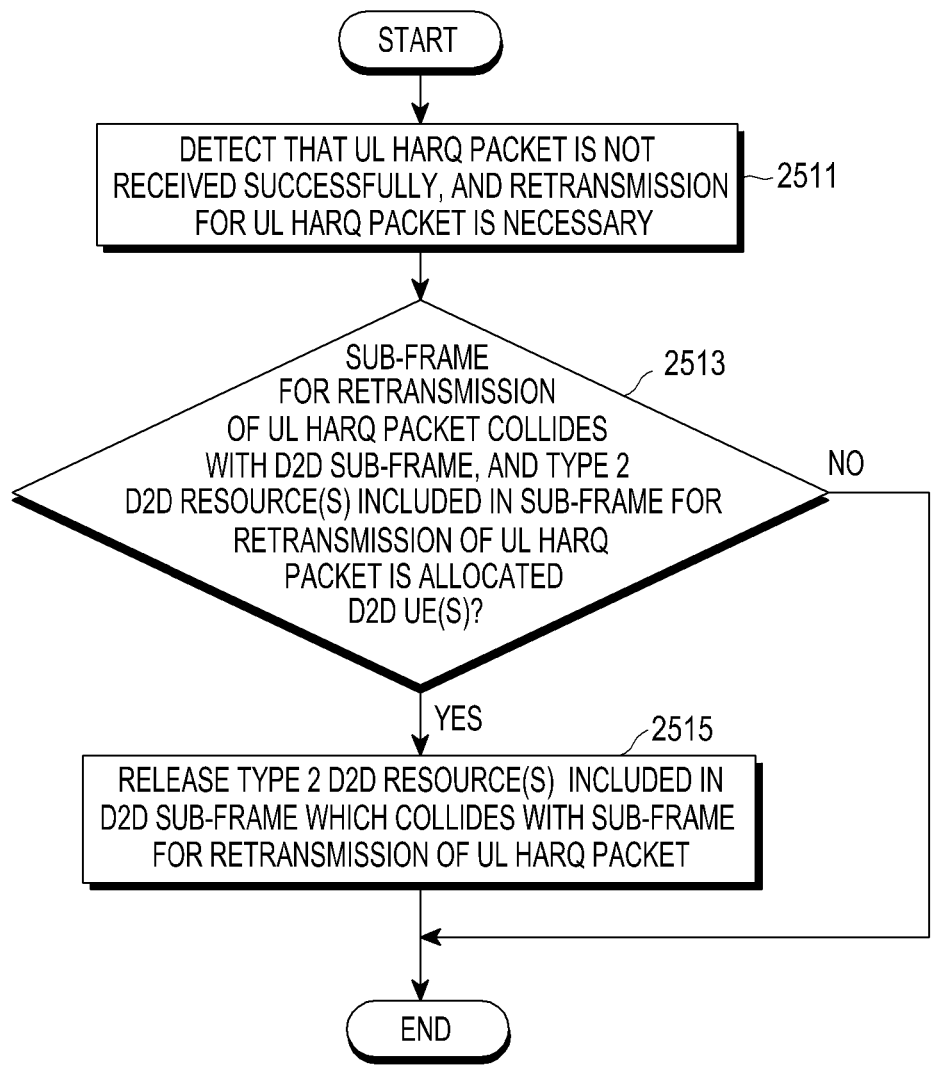
FIG. 25 is a flowchart illustrating an operating process of a BS in a HARQ-D2D transmission collision avoidance scheme #7 in a communication system supporting a D2D scheme according to an embodiment of the present disclosure.

FIG. 25 is a flowchart illustrating an operating process of a BS for HARQ packet retransmission in a HARQ-D2D transmission collision avoidance scheme #7 in a communication system supporting a D2D scheme according to an embodiment of the present disclosure.

Referring to FIG. 25, it will be noted that an operating process of a BS is an operating process of a BS for a retransmission of a HARQ packet.

The BS detects that a UL HARQ packet is not received successfully from a UE, and there is a need for retransmitting the UL HARQ packet by the UE at operation 2511. The BS determines whether a sub-frame for a retransmission of the UL HARQ packet retransmitted by the UE collides with a D2D sub-frame including a type 2 D2D resource(s), and a type 2 D2D resource(s) included in the sub-frame for the retransmission of the UL HARQ packet is allocated to a D2D UE(s) at operation 2513. If the sub-frame for the retransmission of the UL HARQ packet collides with the D2D sub-frame including the type 2 D2D resource(s), and the type 2 D2D resource(s) included in the sub-frame for the retransmission of the UL HARQ packet is allocated to the D2D UE(s), the BS determines to release the type 2 D2D resource(s) included in the D2D sub-frame which collides with the sub-frame for the retransmission of the UL HARQ packet, and signals information indicating that the type 2 D2D resource(s) included in the D2D sub-frame which collides with the sub-frame for the retransmission of the UL HARQ packet is released to a UE to which the type 2 D2D resource(s) included in the D2D sub-frame which collides with the sub-frame for the retransmission of the UL HARQ packet is allocated at operation 2515.

If the sub-frame for the retransmission of the UL HARQ packet by the UE does not collide with the D2D sub-frame including the type 2 D2D resource(s), or the type 2 D2D resource(s) included in the D2D sub-frame which collides with the sub-frame for the retransmission of the UL HARQ packet is not allocated to the D2D UE(s), the BS performs a normal operation, i.e., a legacy operation, and a detailed description will be omitted herein.

Although FIG. 25 illustrates still another example of an operating process of a BS in a HARQ-D2D transmission collision avoidance scheme #7 in a communication system supporting a D2D scheme, various changes could be made to FIG. 25. For example, although shown as a series of operations, various operations in FIG. 25 could overlap, occur in parallel, occur in a different order, or occur multiple times.

Meanwhile, in an embodiment of the present disclosure, a HARQ-D2D transmission collision avoidance scheme #7 may be applied by a BS to D2D discovery sub-frames which are configured within a cell which the BS manages.

The HARQ-D2D transmission collision avoidance scheme #7 may be applied by the BS to D2D communication sub-frames which are configured within the cell which the BS manages.

The HARQ-D2D transmission collision avoidance scheme #7 may be applied by the BS to all of the D2D discovery sub-frames and the D2D communication sub-frames which are configured within the cell which the BS manages.

The HARQ-D2D transmission collision avoidance scheme #7 may be applied by the BS to D2D discovery sub-frames which are configured within the cell which the BS manages and to D2D discovery sub-frames which are configured in the neighbor cells.

The HARQ-D2D transmission collision avoidance scheme #7 may be applied by the BS to D2D communication sub-frames which are configured within the cell which the BS manages and to D2D communication sub-frames of the neighbor cells.

The HARQ-D2D transmission collision avoidance scheme #7 may be applied by the BS to all of the D2D discovery sub-frames and the D2D communication sub-frames which are configured within the cell which the BS manages and to all of the D2D discovery sub-frames and the D2D communication sub-frames of the neighbor cells.

An operating process of a UE in a HARQ-D2D transmission collision avoidance scheme #7 in a communication system supporting a D2D scheme will be described with reference to FIG. 26.

Figure 26:
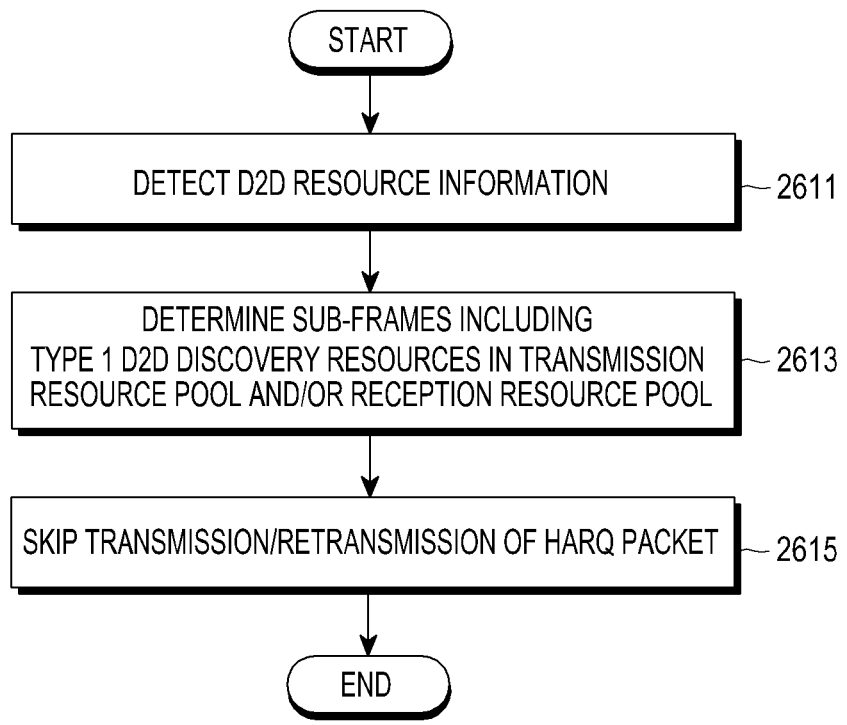
FIG. 26 is a flowchart illustrating an operating process of a UE in a HARQ-D2D transmission collision avoidance scheme #7 in a communication system supporting a D2D scheme according to an embodiment of the present disclosure.

FIG. 26 is a flowchart illustrating an operating process of a UE in a HARQ-D2D transmission collision avoidance scheme #7 in a communication system supporting a D2D scheme according to an embodiment of the present disclosure.

Prior to a description of FIG. 26, an operation of a legacy UE in a case that a HARQ-D2D transmission collision avoidance scheme #6 is applied is identical to an operation of a legacy UE in a case that the HARQ-D2D transmission collision avoidance scheme #7 is not applied, that is, the operation of the legacy UE in the case that the HARQ-D2D transmission collision avoidance scheme #7 is applied is identical to an operation of a general legacy UE, and a detailed description will be omitted herein.

Here, the non-legacy UE denotes a UE which supports a D2D scheme or may detect allocated/reserved resources for a D2D scheme.

Referring to FIG. 26, a UE, i.e., a non-legacy UE receives a signal which a BS transmits, and detects D2D resource information by decoding the received signal at operation 2611. Here, an operation of detecting the D2D resource information in the non-legacy UE will be described below.

The BS transmits system information including D2D discovery resource information, and the non-legacy UE receives the system information from the BS, and detects the D2D discovery resource information based on the received system information. In an embodiment of the present disclosure, system information related to a D2D scheme, i.e., D2D system information may be detected even though the D2D scheme is not supported by the non-legacy UE. The system information, i.e., the D2D system information includes information related to a type 1 transmission resource pool and/or a type 1 reception resource pool including type 1 D2D resources and type 2 D2D resources. The D2D system information includes information related to which resources are used as type 1 D2D resources and/or type 2 D2D resources.

The non-legacy UE determines sub-frames including type 1 D2D discovery resources among a transmission resource pool and/or a reception resource pool at operation 2613. The non-legacy UE skips a transmission/retransmission of a HARQ packet upon detecting that a sub-frame for the HARQ packet collides with the determined D2D sub-frames at operation 2615.

Although FIG. 26 illustrates an operating process of a UE in a HARQ-D2D transmission collision avoidance scheme #7 in a communication system supporting a D2D scheme, various changes could be made to FIG. 26. For example, although shown as a series of operations, various operations in FIG. 26 could overlap, occur in parallel, occur in a different order, or occur multiple times.

Meanwhile, in an embodiment of the present disclosure, a HARQ-D2D transmission collision avoidance scheme #7 may be applied by a UE to D2D discovery sub-frames within a serving cell of the UE.

The HARQ-D2D transmission collision avoidance scheme #7 may be applied by the UE to D2D communication sub-frames within the serving cell of the UE.

The HARQ-D2D transmission collision avoidance scheme #7 may be applied by the UE to all of the D2D discovery sub-frames and the D2D communication sub-frames within the serving cell of the UE.

The HARQ-D2D transmission collision avoidance scheme #7 may be applied by the UE to D2D discovery sub-frames within the serving cell of the UE and to D2D discovery sub-frames of neighbor cells.

The HARQ-D2D transmission collision avoidance scheme #7 may be applied by the UE to D2D communication sub-frames within the serving cell of the UE and to D2D discovery sub-frames of the neighbor cells.

The HARQ-D2D transmission collision avoidance scheme #7 may be applied by the UE to all of the D2D discovery sub-frames and the D2D communication sub-frames within the serving cell of the UE and to all of the D2D discovery sub-frames and the D2D communication sub-frames of the neighbor cells.

A HARQ-D2D transmission collision avoidance scheme #7 in a communication system supporting a D2D scheme has been described with reference to FIGS. 23 to 26, and a process of signaling D2D resource information in a communication system supporting a D2D scheme will be described with reference to FIG. 27.

Figure 27:
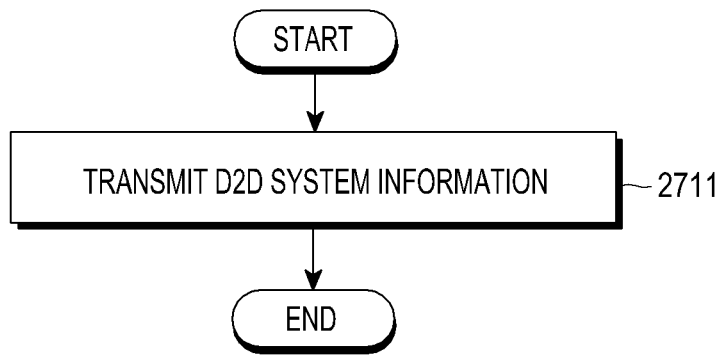
FIG. 27 is a flowchart illustrating a process of signaling D2D resource information in a communication system supporting a D2D scheme according to an embodiment of the present disclosure.

FIG. 27 is a flowchart illustrating a process of signaling D2D resource information in a communication system supporting a D2D scheme according to an embodiment of the present disclosure.

Referring to FIG. 27, the BS transmits D2D system information including information on D2D discovery resources at operation 2711. Here, the D2D system information includes information on a type 1 transmission resource pool and/or a type 1 reception resource pool. The D2D system information includes information related to which resources are used as a type 1 D2D resource and/or a type 2 D2D resource in a reception resource pool. In the communication system, resources included in the reception resource pool are not classified into type 1 resources and type 2 resources.

A process of signaling D2D resource information in a communication system supporting a D2D scheme has been described with reference to FIG. 27, and an inner structure of a BS in a communication system supporting a D2D scheme will be described with reference to FIG. 28.

Figure 28:
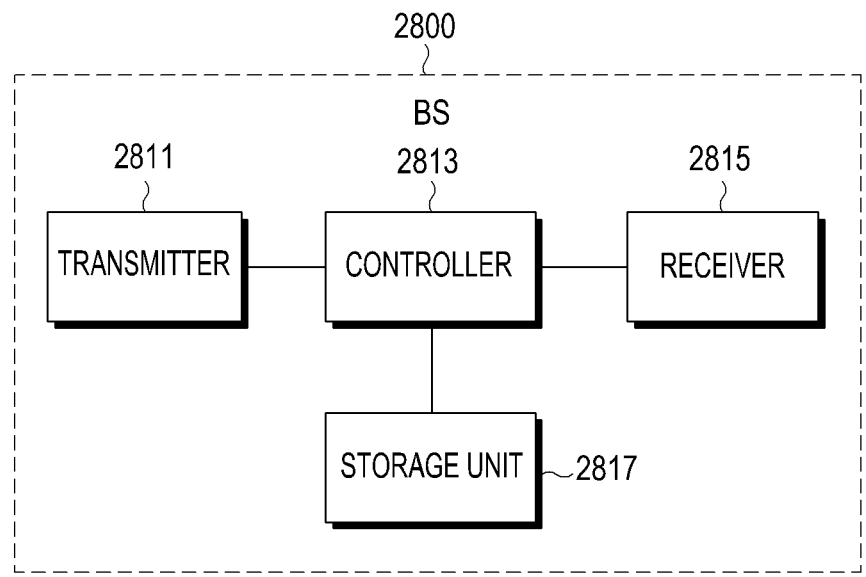
FIG. 28 illustrates an inner structure of a BS in a communication system supporting a D2D scheme according to an embodiment of the present disclosure.

FIG. 28 illustrates an inner structure of a BS in a communication system supporting a D2D scheme according to an embodiment of the present disclosure.

Referring to FIG. 28, a BS 2800 includes a transmitter 2811, a controller 2813, a receiver 2815, and a storage unit 2817.

The controller 2813 controls the overall operation of the BS 2800. More particularly, the controller 2813 controls the BS 2800 to perform an operation related to an operation of avoidance a collision between a HARQ transmission and a D2D transmission, i.e., an operation related to an operation of avoidance a collision between a HARQ transmission and a D2D transmission based on a HARQ-D2D transmission collision avoidance scheme #1 to a HARQ-D2D transmission collision avoidance scheme #7. The operation related to the operation of avoiding the collision between the HARQ transmission and the D2D transmission is performed in the manner described with reference to FIGS. 2 to 27, and a description thereof will be omitted herein.

The transmitter 2811 transmits various signals, various messages, and the like to a UE, and the like under a control of the controller 2813. The various signals, the various messages, and the like transmitted in the transmitter 2811 have been described in FIGS. 2 to 27, and a description thereof will be omitted herein.

The receiver 2815 receives various signals, various messages, and the like from the UE, and the like under a control of the controller 2813. The various signals, the various messages and the like received in the receiver 2815 have been described in FIGS. 2 to 27, and a description thereof will be omitted herein.

The storage unit 2817 stores a program and various data used for the operation of the BS 2800, information related to the operation of avoiding the collision between the HARQ transmission and the D2D transmission, and the like. The storage unit 2817 stores the various signals, the various messages, and the like received in the receiver 2815.

While the transmitter 2811, the controller 2813, the receiver 2815, and the storage unit 2817 are described as separate processors, it is to be understood that this is merely for convenience of description. In other words, two or more of the transmitter 2811, the controller 2813, the receiver 2815, and the storage unit 2817 may be incorporated into a single processor.

An inner structure of a BS in a communication system supporting a D2D scheme has been described with reference to FIG. 28, and an inner structure of a UE in a communication system supporting a D2D scheme will be described with reference to FIG. 29.

Figure 29:
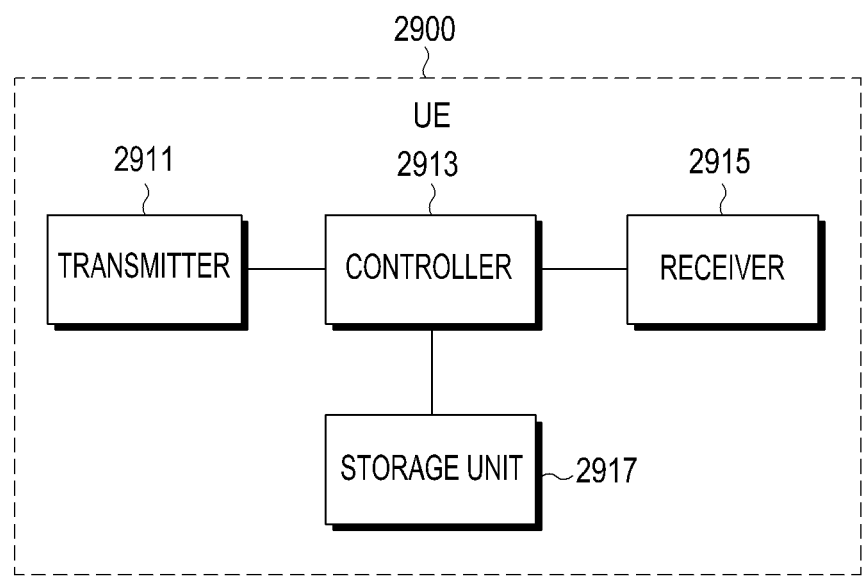
FIG. 29 illustrates an inner structure of a UE in a communication system supporting a D2D scheme according to an embodiment of the present disclosure.

FIG. 29 illustrates an inner structure of a UE in a communication system supporting a D2D scheme according to an embodiment of the present disclosure.

Referring to FIG. 29, a UE 2900 includes a transmitter 2911, a controller 2913, a receiver 2915, and a storage unit 2917.

The controller 2913 controls the overall operation of the UE 2900. More particularly, the controller 2913 controls the UE 2900 to perform an operation related to an operation of avoiding a collision between a HARQ transmission and a D2D transmission, i.e., an operation related to an operation of avoiding a collision between a HARQ transmission and a D2D transmission based on a HARQ-D2D transmission collision avoidance scheme #1 to a HARQ-D2D transmission collision avoidance scheme #7. The operation related to the operation of avoiding the collision between the HARQ transmission and the D2D transmission is performed in the manner described with reference to FIGS. 2 to 27, and a description thereof will be omitted herein.

The transmitter 2911 transmits various signals, various messages, and the like to a BS, and the like under a control of the controller 2913. The various signals, the various messages, and the like transmitted in the transmitter 2911 have been described in FIGS. 2 to 27, and a description thereof will be omitted herein.

The receiver 2915 receives various signals, various messages, and the like from the BS, and the like under a control of the controller 2913. The various signals, the various messages and the like received in the receiver 2915 have been described in FIGS. 2 to 27, and a description thereof will be omitted herein.

The storage unit 2917 stores a program and various data used for the operation of the UE 2900, information related to the operation of avoiding the collision between the HARQ transmission and the D2D transmission, and the like. The storage unit 2917 stores the various signals, the various messages, and the like received in the receiver 2915.

While the transmitter 2911, the controller 2913, the receiver 2915, and the storage unit 2917 are described as separate processors, it is to be understood that this is merely for convenience of description. In other words, two or more of the transmitter 2911, the controller 2913, the receiver 2915, and the storage unit 2917 may be incorporated into a single processor.

As is apparent from the foregoing description, an embodiment of the present disclosure enables to prevent a collision between a HARQ transmission by a UE and a D2D transmission by another UE in a communication system supporting a D2D scheme.

An embodiment of the present disclosure enables to prevent a collision between a HARQ transmission by a UE and a D2D transmission by another UE based on a UE type in a communication system supporting a D2D scheme.

An embodiment of the present disclosure enables to prevent a collision between a HARQ transmission by a UE and a D2D transmission by another UE based on a resource type in a communication system supporting a D2D scheme.

An embodiment of the present disclosure enables to skip a HARQ transmission and a HARQ retransmission based on a UE type in a communication system supporting a D2D scheme.

An embodiment of the present disclosure enables to skip a HARQ transmission and a HARQ retransmission based on a resource type in a communication system supporting a D2D scheme.

An embodiment of the present disclosure enables to schedule a HARQ transmission and a HARQ retransmission based on whether there is a collision between a D2D discovery resource and a non-D2D discovery resource in a communication system supporting a D2D scheme.

An embodiment of the present disclosure enables to schedule a new HARQ transmission based on a UE type in a communication system supporting a D2D scheme.

An embodiment of the present disclosure enables to schedule a new HARQ transmission based on a resource type in a communication system supporting a D2D scheme.

An embodiment of the present disclosure enables to schedule a new HARQ transmission based on whether there is a collision between a D2D discovery resource and a non-D2D discovery resource in a communication system supporting a D2D scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc-ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion.

In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information used for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a base station (BS) in a communication system, the method comprising:
   determining whether a user equipment (UE) is a legacy UE or a non-legacy UE;
   determining non-device to device (D2D) sub-frames to be collided with D2D sub-frames if the UE is the non-legacy UE;
   determining whether the non-D2D sub-frames are available; and
   scheduling a new hybrid automatic repeat request (HARQ) packet for the UE in the determined non-D2D sub-frames if the determined non-D2D sub-frames are available.

2. The method of claim 1, further comprising:
scheduling a new HARQ packet for the UE in non-D2D sub-frames other than the determined non-D2D sub-frames if the determined non-D2D sub-frames are unavailable.

3. The method of claim 1, further comprising:
determining non-D2D sub-frames such that, if a new HARQ packet of a HARQ process is started or scheduled in the non-D2D sub-frames then, a HARQ packet transmission or retransmissions of the HARQ process is to be collided with D2D transmissions in D2D sub-frames if the UE is the legacy UE; and
scheduling a new HARQ packet for the UE in sub-frames other than the determined non-D2D sub-frames and the D2D sub-frames.

4. The method of claim 1, further comprising:
determining non-D2D sub-frames such that, if a new HARQ packet of a HARQ process is started or scheduled in the non-D2D sub-frames, then a HARQ packet transmission or retransmissions of the HARQ process is to be collided with D2D transmissions in D2D sub-frames if the UE is the legacy UE; and
preventing scheduling a new HARQ packet for the UE in the determined non-D2D sub-frames.

5. The method of claim 1, further comprising:
transmitting a HARQ acknowledgement (ACK) signal instead of a HARQ negative acknowledgement (NACK) signal, if the sub-frames where an uplink (UL) HARQ packet to be retransmitted collides with the D2D sub-frames.

6. The method of claim 1, wherein the determining of whether the UE is the legacy UE or the non-legacy UE comprises determining whether the UE is the legacy UE or the non-legacy UE based on at least one of capability information of the UE or a UE subscription profile of the UE.

7. The method of claim 1, wherein the determining of the non-D2D sub-frames to be collided with the D2D sub-frames comprises determining the non-D2D sub-frames to be collided with the D2D sub-frames based on at least one of location of a D2D sub-frame, a time interval between two HARQ packets of a HARQ process, or a maximum transmission number for uplink (UL) HARQ.

8. The method of claim 1, wherein the legacy UE is a UE which does not support the D2D scheme.

9. The method of claim 1, wherein the D2D sub-frames comprise at least one of D2D discovery sub-frames which are configured within a service cell which the BS manages, D2D communication sub-frames which are configured within the service cell which the BS manages, D2D discovery sub-frames which are configured within neighbor cells, or D2D communication sub-frames which are configured within the neighbor cells.

10. A method performed by a user equipment (UE) in a communication system, the method comprising:
determining whether the UE is a legacy UE or a non-legacy UE;
detecting device to device (D2D) resource information if the UE is the non-legacy UE;
determining D2D sub-frames based on the D2D resource information;
detecting that a sub-frame for transmission/retransmission of a hybrid automatic repeat request (HARQ) packet is to be collided with the D2D sub-frames while transmitting/retransmitting the HARQ packet; and
skipping the transmission/retransmission of the HARQ packet after detecting that the sub-frame for the transmission/retransmission of the HARQ packet is to be collided with the D2D sub-frames.

11. The method of claim 10, wherein the determining of whether the UE is the legacy UE or the non-legacy UE comprises determining whether the UE is the legacy UE or the non-legacy UE based on at least one of capability information of the UE or a UE subscription profile of the UE.

12. The method of claim 10, wherein the detecting of the D2D resource information comprises:
receiving D2D system information from a base station (BS); and
detecting the D2D resource information based on the D2D system information.

13. The method of claim 10, wherein the legacy UE is a UE which does not support the D2D scheme.

14. The method of claim 10, wherein the D2D sub-frames comprise at least one of D2D discovery sub-frames which are configured within a service cell which the BS manages, D2D communication sub-frames which are configured within the service cell which the BS manages, D2D discovery sub-frames which are configured within neighbor cells, or D2D communication sub-frames which are configured within the neighbor cells.

15. A base station (BS) in a communication system, the BS comprising:
a memory configured to store instructions therein;
at least one processor configured, upon execution of the instructions, to perform:
an operation of determining whether a user equipment (UE) is a legacy UE or a non-legacy UE,
an operation of determining non-device to device (D2D) sub-frames to be collided with D2D sub-frames if the UE is a non-legacy UE,
an operation of determining whether the non-D2D sub-frames are available, and
an operation of scheduling a new hybrid automatic repeat request (HARQ) packet for the UE in the determined non-D2D sub-frames if the determined non-D2D sub-frames are available.

16. The BS of claim 15, wherein the at least one processor is further configured to schedule a new HARQ packet for the UE in non-D2D sub-frames other than the determined non-D2D sub-frames if the determined non-D2D sub-frames are unavailable.

17. The BS of claim 15, wherein the at least one processor is further configured to:
determine non-D2D sub-frames such that, if a new HARQ packet of a HARQ process is started or scheduled in the non-D2D sub-frames, then a HARQ packet transmission or retransmissions of the HARQ process will collide with D2D transmissions in D2D sub-frames if the UE is the legacy UE, and
schedule a new HARQ packet for the UE in sub-frames other than the determined non-D2D sub-frames and the D2D sub-frames.

18. The BS of claim 15, wherein the at least one processor is further configured to:
determine non-D2D sub-frames such that, if a new HARQ packet of a HARQ process is started or scheduled in the non-D2D sub-frames, then a HARQ packet transmission or retransmissions of the HARQ process is to be collided with D2D transmissions in D2D sub-frames if the UE is the legacy UE, and
prevent scheduling a new HARQ packet for the UE in the determined non-D2D sub-frames.

19. The BS of claim 15, wherein the BS transmits a HARQ acknowledgement (ACK) signal instead of a HARQ negative acknowledgement (NACK) signal, if the sub-frames where an uplink (UL) HARQ packet to be retransmitted collides with the D2D sub-frames.

20. The BS of claim 15, wherein the operation of determining whether the UE is the legacy UE or the non-legacy UE comprises an operation of determining whether the UE is the legacy UE or the non-legacy UE based on at least one of capability information of the UE or a UE subscription profile of the UE.

21. The BS of claim 15, wherein the operation of determining the non-D2D sub-frames to be collided with the D2D sub-frames comprises an operation of determining the non-D2D sub-frames to be collided with the D2D sub-frames based on at least one of location of a D2D sub-frame, a time interval between two HARQ packets of a HARQ process, or a maximum transmission number for uplink (UL) HARQ.

22. The BS of claim 15, wherein the legacy UE is a UE which does not support the D2D scheme.

23. The BS of claim 15, wherein the D2D sub-frames comprise at least one of D2D discovery sub-frames which are configured within a service cell which the BS manages, D2D communication sub-frames which are configured within the service cell which the BS manages, D2D discovery sub-frames which are configured within neighbor cells, or D2D communication sub-frames which are configured within the neighbor cells.

24. A user equipment (UE) in a communication system, the UE comprising:
- a storage configured to store instructions therein;
- a transmitter;
- a receiver; and
- at least one processor configured, upon execution of the instructions, to perform:
  - an operation of determining whether the UE is a legacy UE or a non-legacy UE,
  - an operation of detecting device to device (D2D) resource information if the UE is the non-legacy UE,
  - an operation of determining D2D sub-frames based on the D2D resource information,
  - an operation of detecting that a sub-frame for transmission/retransmission of a hybrid automatic repeat request (HARQ) packet is to be collided with the D2D sub-frames while transmitting/retransmitting the HARQ packet, and
  - an operation of skipping the transmission/retransmission of the HARQ packet after detecting that the sub-frame for the transmission/retransmission of the HARQ packet is to be collided with the D2D sub-frames.

25. The UE of claim 24, wherein the operation of determining whether the UE is the legacy UE or the non-legacy UE comprises an operation of determining whether the UE is the legacy UE or the non-legacy UE based on at least one of capability information of the UE or a UE subscription profile of the UE.

26. The UE of claim 24, wherein the operation of detecting the D2D resource information comprises an operation of receiving D2D system information from a base station (BS), and an operation of detecting the D2D resource information based on the D2D system information.

27. The UE of claim 24, wherein the legacy UE is a UE which does not support the D2D scheme.

28. The UE of claim 24, wherein the D2D sub-frames comprise at least one of D2D discovery sub-frames which are configured within a service cell which the BS manages, D2D communication sub-frames which are configured within the service cell which the BS manages, D2D discovery sub-frames which are configured within neighbor cells, or D2D communication sub-frames which are configured within the neighbor cells.

* * * * *